(12) United States Patent  
Shimomugi et al.

(10) Patent No.: US 9,240,736 B2  
(45) Date of Patent: Jan. 19, 2016

(54) POWER CONVERTING DEVICE, MOTOR DRIVING DEVICE, AND REFRIGERATING AND AIR-CONDITIONING APPARATUS

(75) Inventors: Takuya Shimomugi, Tokyo (JP); Koichi Arisawa, Tokyo (JP); Yosuke Shinomoto, Tokyo (JP); Takashi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 14/003,286

(22) PCT Filed: Apr. 8, 2011

(86) PCT No.: PCT/JP2011/002085  
§ 371 (c)(1),  
(2), (4) Date: Sep. 5, 2013

(87) PCT Pub. No.: WO2012/137258  
PCT Pub. Date: Oct. 11, 2012

(65) Prior Publication Data  
US 2013/0342139 A1 Dec. 26, 2013

(51) Int. Cl.  
*H02P 27/00* (2006.01)  
*H02H 7/08* (2006.01)  
(Continued)

(52) U.S. Cl.  
CPC .............. *H02M 7/066* (2013.01); *H02M 1/32* (2013.01); *H02M 3/156* (2013.01); *H02P 27/00* (2013.01);  
(Continued)

(58) Field of Classification Search  
CPC .................. H02M 7/066; H02P 27/00  
USPC ................ 318/400.3, 432, 801, 375  
See application file for complete search history.

(56) References Cited

U.S. PATENT DOCUMENTS 5,736,842 A * 4/1998 Jovanovic ............ H02M 1/34  
323/222  
5,959,438 A * 9/1999 Jovanovic ............ H02M 1/34  
323/222

(Continued)

FOREIGN PATENT DOCUMENTS

EP 0695024 A2 1/1996  
EP 1 862 348 A1 12/2007  
(Continued)

OTHER PUBLICATIONS

International Search Report of the International Searching Authority mailed May 10, 2011 for the corresponding international application No. PCT/JP2011/002085 (with English translation).

(Continued)

*Primary Examiner* — Eduardo Colon Santana  
*Assistant Examiner* — Bickey Dhakal  
(74) *Attorney, Agent, or Firm* — Posz Law Group, PLC

(57) ABSTRACT

A power converting device includes; one or more backflow preventing elements that prevent electric current from flowing backward from a load side toward a power supply; a commutating unit for performing a commutation operation for causing electric current to flow toward a different path that is connected in parallel with the one or more backflow preventing elements; a malfunction detector for detecting a malfunction of the commutating unit; and a controller configured to control the commutating unit to perform commutation operation just before the recovery current flows through the backflow preventing element from the load side to the power supply and to perform operation control related to protection of the commutating unit on a basis of detection by the malfunction detector.

19 Claims, 22 Drawing Sheets

(51) Int. Cl.
  *H02M 7/06* (2006.01)
  *H02P 27/06* (2006.01)
  *H02M 1/32* (2007.01)
  *H02M 3/156* (2006.01)
  *H02M 3/158* (2006.01)
  *H02M 1/42* (2007.01)
  *H02M 1/00* (2007.01)

(52) U.S. Cl.
  CPC ............ *H02P 27/06* (2013.01); *H02M 1/4225* (2013.01); *H02M 3/1584* (2013.01); *H02M 2001/0051* (2013.01); *H02M 2001/325* (2013.01); *H02M 2003/1586* (2013.01)

(56) References Cited

U.S. PATENT DOCUMENTS

| | | | | |
|---|---|---|---|---|
| 2002/0190689 | A1* | 12/2002 | Nakamura et al. | 320/102 |
| 2008/0007190 | A1* | 1/2008 | Kunii et al. | 318/141 |
| 2008/0062604 | A1* | 3/2008 | Brombach et al. | 361/100 |
| 2008/0080989 | A1* | 4/2008 | Bellero et al. | 417/374 |
| 2011/0127936 | A1* | 6/2011 | Ogasawara | 318/400.3 |
| 2011/0132899 | A1* | 6/2011 | Shimomugi et al. | 219/620 |

FOREIGN PATENT DOCUMENTS

| | | |
|---|---|---|
| JP | 59-117459 A | 7/1984 |
| JP | 2002-095245 A | 3/2002 |
| JP | 2005-160284 A | 6/2005 |
| JP | 2006-006061 A | 1/2006 |
| JP | 2006-067696 A | 3/2006 |
| JP | 2008-061403 A | 3/2008 |
| JP | 2010-166719 A | 7/2010 |
| JP | 2010-226869 A | 10/2010 |
| KR | 10-2000-0001770 A | 1/2000 |

OTHER PUBLICATIONS

Office Action dated Jan. 28, 2015 issued in corresponding KR patent application No. 10-2013-7025022 (and English translation).

Office Action dated Dec. 8, 2014 issued in corresponding AU patent application No. 2011365142.

Office Action mailed Apr. 15, 2015 in the corresponding CN application No. 201180069890.6 (with English translation).

Extended European Search Report issued on Jul. 8, 2015 in the corresponding EP application No. 11862932.8.

* cited by examiner

DRIVE SIGNAL

F I G. 3
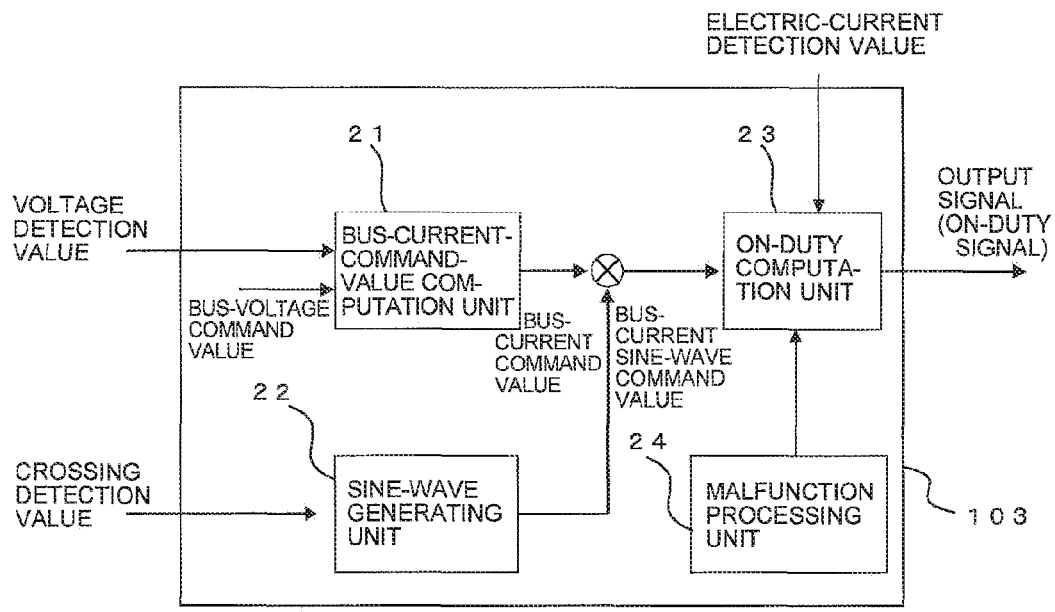

FIG. 9
| | |
|---|---|
| ELECTRIC CURRENT FLOWING THROUGH SHORT-CIRCUITING MEANS 4 | 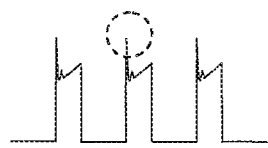 |
| RATE OF CHANGE OF ELECTRIC CURRENT FLOWING THROUGH SHORT-CIRCUITING MEANS 4 | 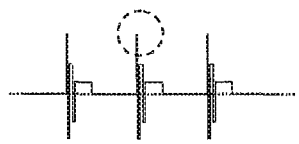 |
| ELECTRIC CURRENT FLOWING THROUGH BACKFLOW PREVENTING ELEMENT 5 | 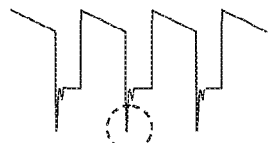 |
| RATE OF CHANGE OF ELECTRIC CURRENT FLOWING THROUGH BACKFLOW PREVENTING ELEMENT 5 | 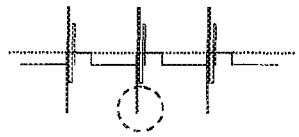 |

F I G. 10
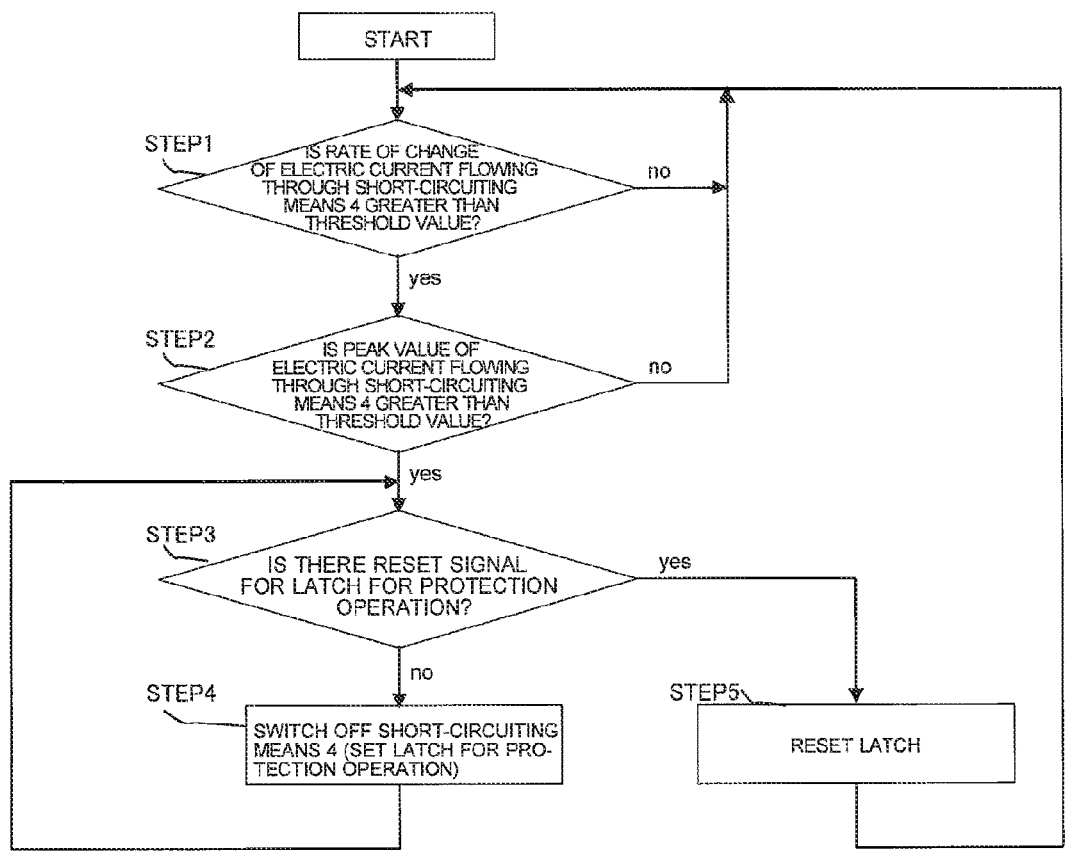

F I G. 1 1
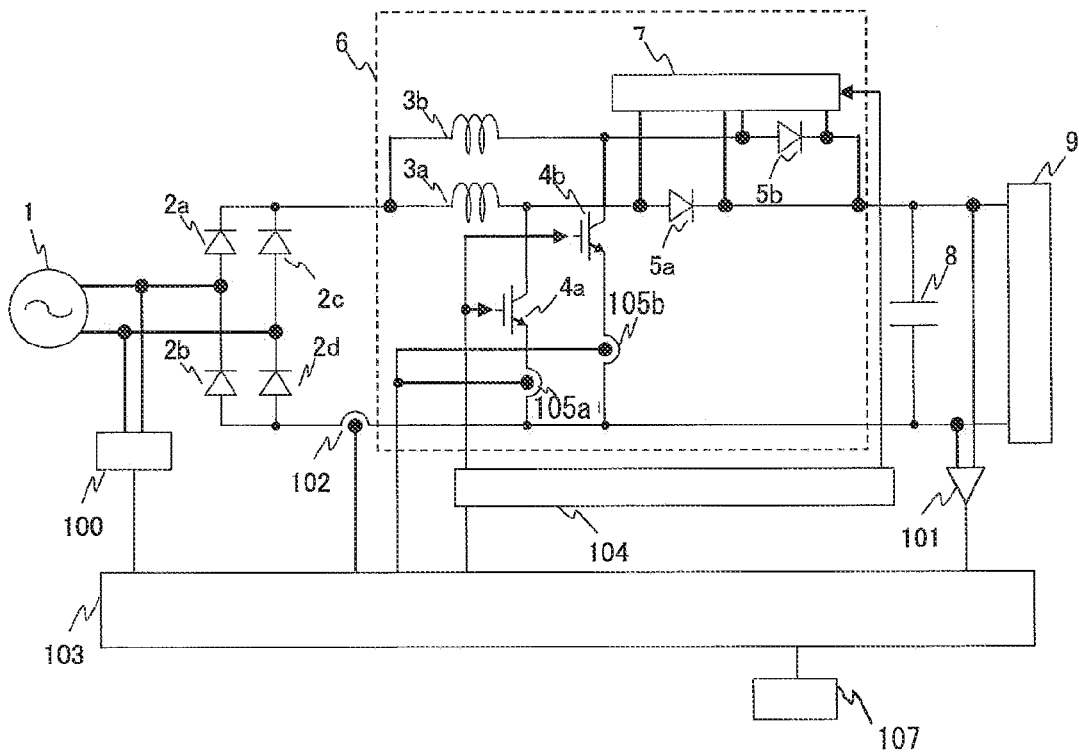

FIG. 12
(a)
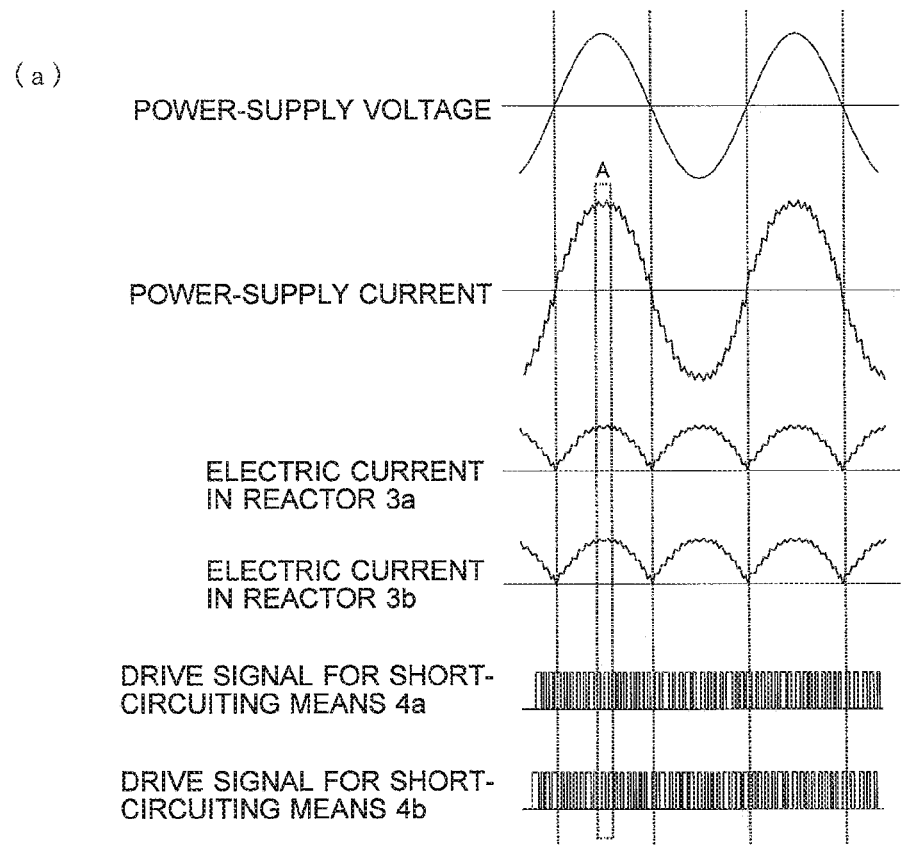
(b)
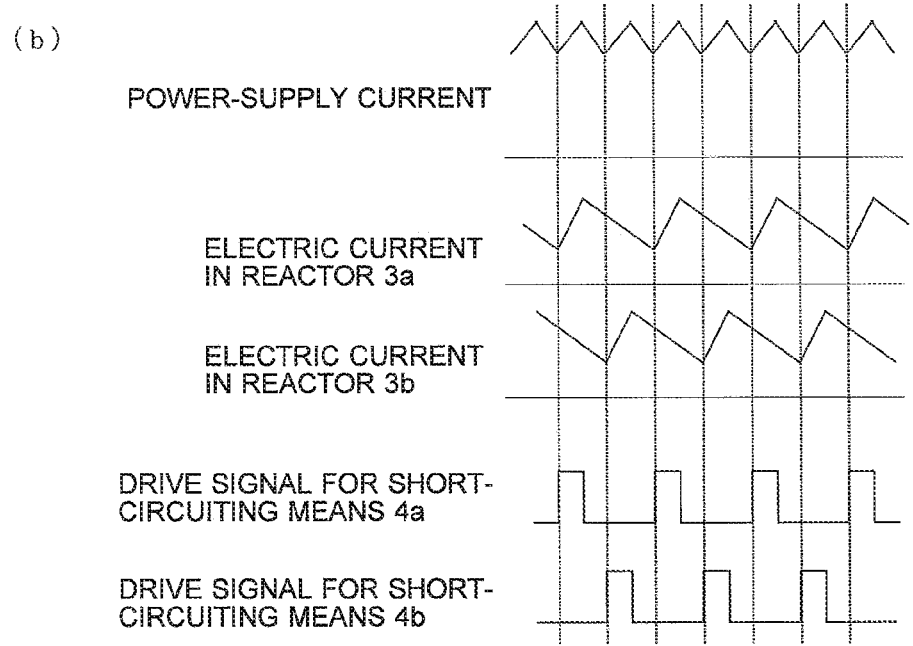

FIG. 13

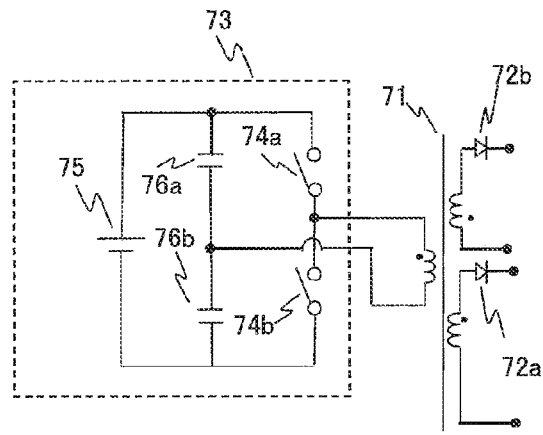

FIG. 14

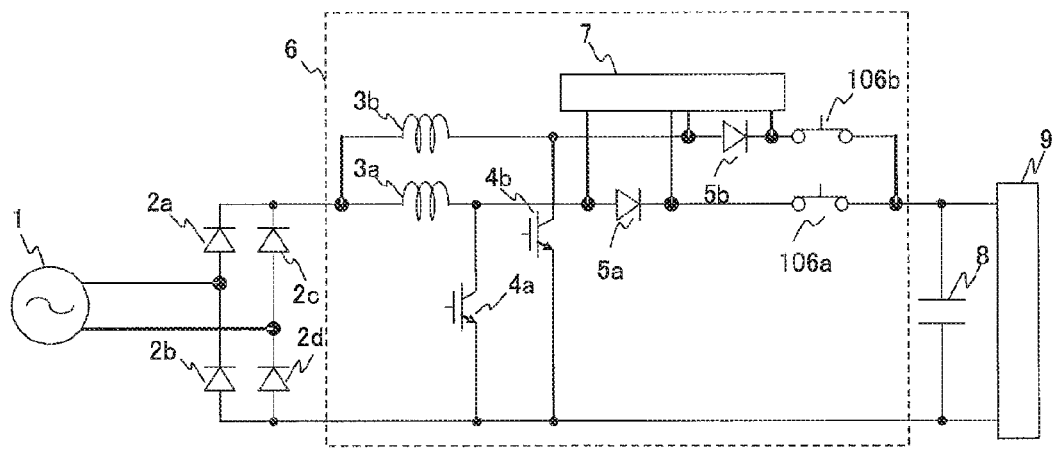

FIG. 15

| | | LOAD | |
|---|---|---|---|
| | | SMALL | LARGE |
| OPERABILITY OF COMMUTA- TING MEANS | BACKFLOW PREVENTING ELEMENT 5a SIDE: OPERABLE BACKFLOW PREVENTING ELEMENT 5b SIDE: OPERABLE | SHORT-CIRCUITING MEANS 4a: OFF SHORT-CIRCUITING MEANS 4b: OFF | SHORT-CIRCUITING MEANS 4a: ON SHORT-CIRCUITING MEANS 4b: ON |
| | BACKFLOW PREVENTING ELEMENT 5a SIDE: OPERABLE BACKFLOW PREVENTING ELEMENT 5b SIDE: INOPERABLE | SHORT-CIRCUITING MEANS 4a: OFF SHORT-CIRCUITING MEANS 4b: OFF | SHORT-CIRCUITING MEANS 4a: ON SHORT-CIRCUITING MEANS 4b: OFF |
| | BACKFLOW PREVENTING ELEMENT 5a SIDE: INOPERABLE BACKFLOW PREVENTING ELEMENT 5b SIDE: OPERABLE | SHORT-CIRCUITING MEANS 4a: OFF SHORT-CIRCUITING MEANS 4b: OFF | SHORT-CIRCUITING MEANS 4a: OFF SHORT-CIRCUITING MEANS 4b: ON |
| | BACKFLOW PREVENTING ELEMENT 5a SIDE: INOPERABLE BACKFLOW PREVENTING ELEMENT 5b SIDE: INOPERABLE | SHORT-CIRCUITING MEANS 4a: OFF SHORT-CIRCUITING MEANS 4b: OFF | SHORT-CIRCUITING MEANS 4a: OFF SHORT-CIRCUITING MEANS 4b: OFF |

F I G. 2 5
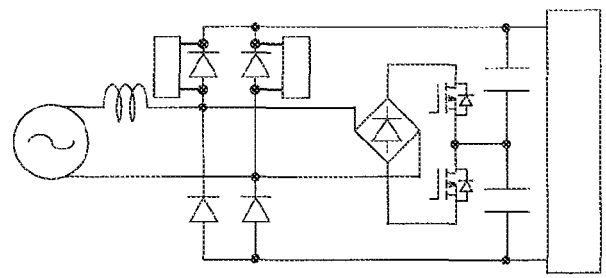
F I G. 2 6
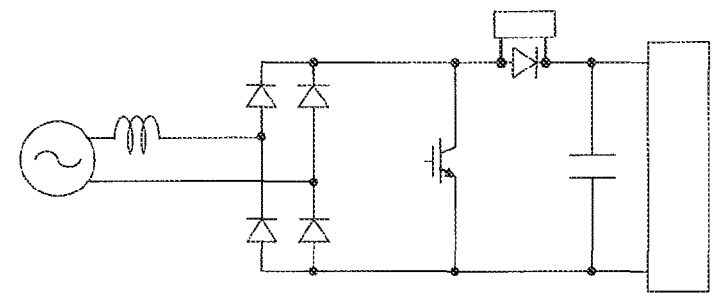
F I G. 2 7
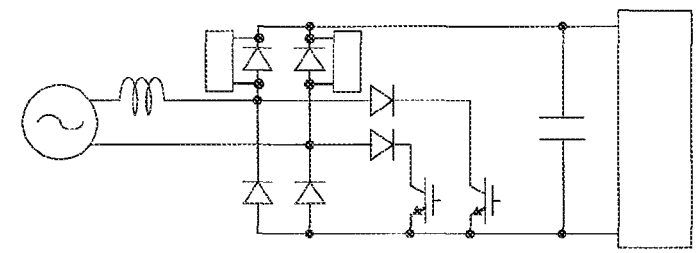
F I G. 2 8
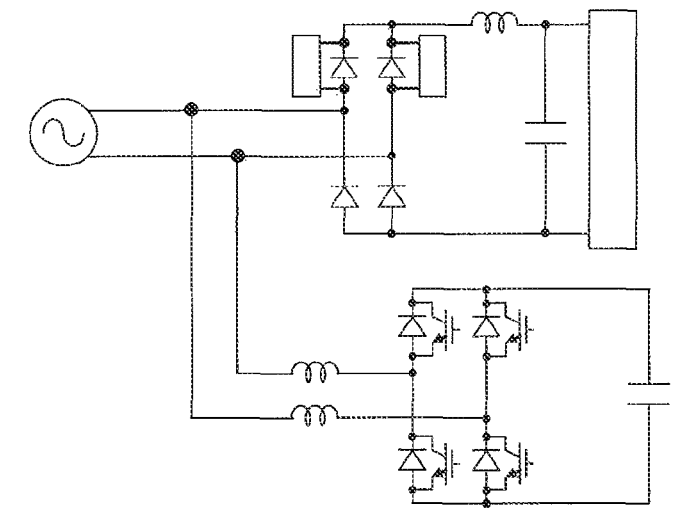

POWER CONVERTING DEVICE, MOTOR DRIVING DEVICE, AND REFRIGERATING AND AIR-CONDITIONING APPARATUS

CROSS REFERENCE TO RELATED APPLICATION

This application is a U.S. national stage application of International Application No. PCT/JP2011/002085 filed on Apr. 8, 2011.

TECHNICAL FIELD

The present invention relates to power converting devices, motor driving devices, and refrigerating and air-conditioning apparatus. In particular, the present invention relates to protection of devices.

BACKGROUND ART

Application fields of various kinds of power converting devices have been studied in accordance with advancements in practical implementation of, for example, variable-voltage variable-frequency inverters.

For example, with regard to power converting devices, the applied technology of buck-boost converters has been actively developed in recent years. On the other hand, for example, wide band-gap semiconductors composed of, for example, silicon carbide have also been actively developed. With regard to such new elements, elements that have high voltage resistant characteristics but have small current-carrying capacity (i.e., a low permissible effective electric-current value) are put to practical use mainly as rectifiers (for example, see Patent Literature 1).

CITATION LIST

Patent Literature

Patent Literature 1: Japanese Unexamined Patent Application Publication No. 2005-160284 (FIG. 1)

SUMMARY OF INVENTION

Technical Problem

On the other hand, with regard to practical implementation of new highly-efficient elements, there are many problems for putting, for example, elements with large electric-current capacity to practical use in terms of, for example, high costs and crystal defects. Thus, it is conceivable that it may take time for such elements to become popular. Therefore, at the present time, it is difficult to achieve increased efficiency by using the new elements in, for example, apparatuses that handle electric power that is higher than or equal to electric power to be supplied to, for example, motors for compressors in air-conditioning apparatuses. For this reason, for example, in a backflow preventing element for stopping the flow of electric current flowing backward from a load toward a power supply, it is difficult to reduce a loss caused by recovery electric current occurring when the electric current flows backward.

In view of the problems described above, an object of the present invention is to provide, for example, a highly-efficient, highly reliable power converting device that reduces recovery electric current occurring in the event of backflow of electric current and that performs protection of, for example, the device when a malfunction occurs, such as when a component, such as an element or a unit, becomes nonfunctional.

Solution to Problem

A power converting device according to the present invention includes a rectifying circuit that rectifies voltage of a power supply; smoothing means that smoothes output voltage from the rectifying circuit; short-circuiting means that is disposed more closely to the power supply than the smoothing means and that short-circuits the power supply and controls at least one of electric current and voltage; a reactor that is disposed more closely to the power supply than the short-circuiting means; one or more backflow preventing elements that prevent electric current from flowing backward from a load side toward the power supply; commutating means for performing a commutation operation for causing electric current to flow toward a different path that is connected in parallel with the one or more backflow preventing elements; malfunction detecting means for detecting a malfunction of the commutating means; and control means that performs operation control related to protection of the commutating means on the basis of detection by the malfunction detecting means.

Advantageous Effects of Invention

The power converting device according to the present invention is provided with the commutating means that can perform the commutation operation so that the electric current flowing through the backflow preventing element can be commutated to the different path. Thus, when the electric current flows backward from the load side, recovery electric current generated in the backflow preventing element is reduced so that, for example, loss reduction and noise-terminal-voltage level reduction can be achieved and EMC can be coped with, whereby increased efficiency can be achieved in the overall system. Furthermore, when a failure occurs in a component, such as an element constituting the commutating means, and the malfunction detecting means detects a malfunction of the commutating means, the control means performs operation control related to protection, whereby a highly-reliable device can be obtained. Even if the commutating means were to be stopped, the power converting device can still maintain its operation, whereby the device can perform necessary operations while ensuring safety.

BRIEF DESCRIPTION OF DRAWINGS

FIG. 3 illustrates a configuration example of control means according to Embodiment 1.

FIG. 9 illustrates an example of operation waveforms when determining whether there is a malfunction in the power converting device according to Embodiment 1.

FIG. 10 illustrates an example of a flowchart for, for example, determining whether there is a malfunction in the power converting device according to Embodiment 1.

FIG. 11 illustrates a configuration example of a power converting device according to Embodiment 2.

FIG. 12 illustrates examples of operation waveforms according to Embodiment 2.

FIG. 13 illustrates a configuration example of commutating means according to Embodiment 2.

FIG. 14 illustrates another configuration example of the power converting device according to Embodiment 2.

FIG. 15 illustrates an example of malfunction determination according to Embodiment 2.

FIG. 25 illustrates another configuration example of the power converting device according to Embodiment 3.

FIG. 26 illustrates another configuration example of the power converting device according to Embodiment 3.

FIG. 27 illustrates another configuration example of the power converting device according to Embodiment 3.

FIG. 28 illustrates another configuration example of the power converting device according to Embodiment 3.

DESCRIPTION OF EMBODIMENTS

For example, power converting devices according to Embodiments of the present invention will be described below with reference to the drawings, etc.

Embodiment 1

Figure 1:
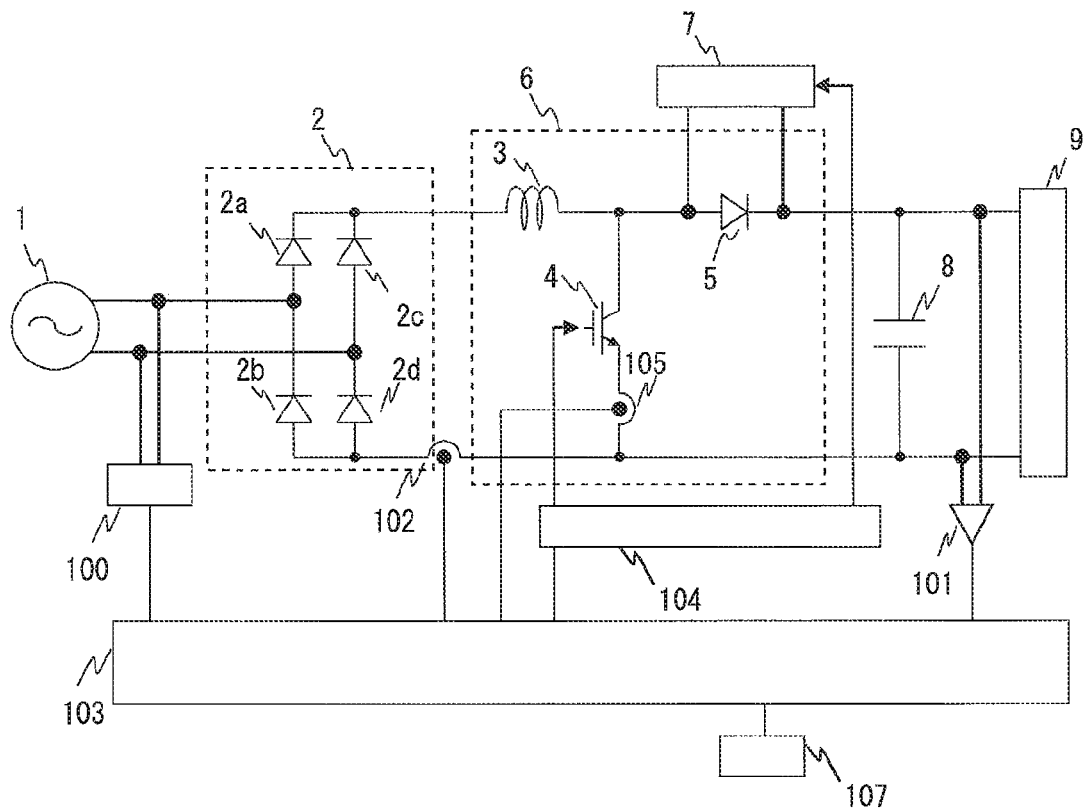
FIG. 1 illustrates a configuration example of a power converting device according to Embodiment 1.

FIG. 1 illustrates a configuration example of, for example, a system having, as a principal element, a power converting device according to Embodiment 1 of the present invention. First, a system configuration having the power converting device in FIG. 1 that can perform power conversion with high efficiency will be described.

In the system in FIG. 1, the power converting device is provided between an alternating-current power supply 1 and a load 9. The power converting device converts alternating-current power from the alternating-current power supply 1 into direct-current power and supplies the direct-current power to the load 9. The power converting device according to Embodiment 1 has, for example, a rectifying circuit 2, a chopper circuit 6, commutating means 7, and smoothing means 8. The rectifying circuit (i.e., rectifying means) 2 is constituted of bridge-connected rectifying elements 2a to 2d, such as diodes, and rectifies the electric power from the alternating-current power supply 1.

The chopper circuit 6 is constituted of a reactor 3, short-circuiting means (i.e., switching means) 4, and a backflow preventing element 5. The reactor 3 is connected to an output side of the rectifier 2 and is provided for suppressing harmonics. The short-circuiting means 4 is constituted of a switching element, such as an IGBT (insulated gate bipolar transistor). The short-circuiting means 4 short-circuits the alternating-current power supply 1 (i.e., between two terminals connected to the alternating-current power supply 1) via the rectifier 2 and the reactor 3 on the basis of a drive signal from a drive-signal generating unit 104.

The backflow preventing element 5 is provided between the short-circuiting means 4 and the smoothing means 8 and is for preventing electric current from flowing backward from the smoothing means 8. Normally, the backflow preventing element 5 is, for example, a semiconductor element, such as a fast recovery diode, having excellent electrical characteristics (i.e., recovery characteristics in particular), small current-carrying capacity, and a fast reverse recovery time. The commutating means 7 is connected in parallel with the backflow preventing element 5. Thus, electric current flowing toward the backflow preventing element 5 is commutated to a different path (i.e., a path that is not intervened by the backflow preventing element 5) at a required timing.

Figure 2:
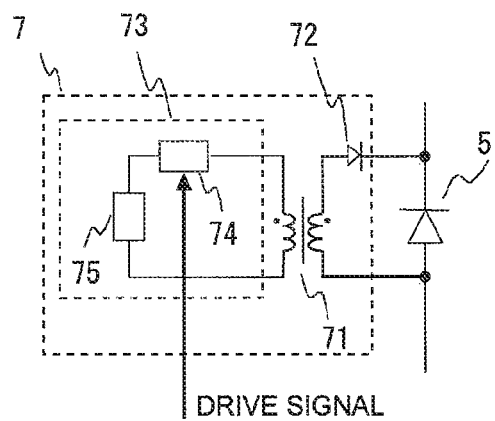
FIG. 2 illustrates a configuration example of commutating means according to Embodiment 1.

FIG. 2 illustrates a configuration example in a case where the commutating means 7 is connected in parallel with the backflow preventing element 5. In FIG. 2, for example, a transformer 71, a commutation rectifying element 72, such as a diode that is connected in series with a secondary winding of the transformer 71, and a transformer driving circuit 73 that drives the transformer 71 constitute the commutating means 7. The transformer driving circuit 73 includes, for example, a commutation power supply 75 for supplying electric power to the transformer 71, and a commutation switch 74 that opens and closes based on a drive signal from the drive-signal generating unit 104 so as to control the electric power supply and the stoppage of the electric power supply to the transformer 71 (i.e., a primary winding). The commutation rectifying element 72 is also constituted of a semiconductor, such as a fast recovery diode.

Although FIG. 2 shows an example in which the secondary winding of the transformer 71 and an anode side of the commutation rectifying element 72 are connected to each other, the connection is not limited to the above so long as the direction in which the electric current flows through the commutation rectifying element 72 is the same. For example, a cathode side of the commutation rectifying element 72 and the secondary winding of the transformer 71 may be connected to each other. Furthermore, although the transformer driving circuit 73 is constituted of the commutation switch 74 and the commutation power supply 75, the transformer driving circuit 73 may alternatively be formed by inserting, for example, a limiting resistor, a high-frequency capacitor, a snubber circuit, or protection means into an electric circuit constituted of the commutation power supply 75, the commutation switch 74, and the primary winding of the transformer 71, where necessary, in view of noise reduction and protection in the event of a failure. A description regarding the protection will be provided later. Furthermore, where necessary, a reset winding may be added to the primary winding of the transformer 71 so that excitation current can be reset. Moreover, by providing, for example, a rectifier, excitation energy may be regenerated at the power supply side so that increased efficiency can be achieved.

The smoothing means 8 is constituted of, for example, a capacitor. The smoothing means 8 is configured to smooth voltage involved with the rectification in the rectifying elements 2a to 2d and apply direct-current voltage (i.e., output voltage, bas line voltage) to the load 9 so as to supply electric power thereto. The load 9 is driven by the electric power supplied via the smoothing means 8.

An input-voltage zero-crossing detecting unit 100 outputs a crossing detection value, which is for detecting a section where voltage (i.e., input voltage) applied by the alternating-current power supply 1 becomes 0 (zero), by means of a detection signal. A bus-voltage detecting unit 101 detects voltage that has been smoothed by the smoothing means 8 and is to be applied to the load 9, and outputs the voltage detection value by means of a detection signal. A bus-current detecting unit 102 detects input electric current (i.e., bus current) flowing from the alternating-current power supply 1 and outputs an electric-current detection value by means of a detection signal.

Switching control means 103 serves as control means that, for example, calculates a short-circuiting time of the short-circuiting means 4 (commutating means 7) from the detection signals from the input-voltage zero-crossing detecting unit 100, the bus-voltage detecting unit 101, and the bus-current detecting unit 102. In particular, in Embodiment 1, the switching control means 103 performs processing for controlling, for example, an opening-and-closing operation of the commutating means 4 on the basis of a malfunction of the commutating means 7. The switching control means 103 includes, for example, a computation unit, such as a microcomputer or a digital signal processor, or a unit having a similar function therein.

FIG. 3 illustrates a configuration example in which the control functions of the switching control means 103 are shown as a block diagram. In FIG. 3, a bus-current-command-value computation unit 21 calculates an effective bus-current command value on the basis of a bus-voltage command value and the voltage detection value related to the detection by the bus-voltage detecting unit 101. A sine-wave generating unit 22 generates a sine wave synchronized with the input voltage on the basis of the crossing detection value related to the detection by the input-voltage zero-crossing detecting unit 100. An on-duty computation unit 23 calculates an on-duty time of the short-circuiting means 4 from a bus-current command value, which is obtained by multiplying an output from the bus-current-command-value computation unit 21 by an output from the sine-wave generating unit 22, and the electric-current detection value related to the detection by the bus-current detecting unit 102, and transmits an output signal (i.e., an on-duty signal). A malfunction processing unit 24, for example, determines whether to perform opening-and-closing control (i.e., opening-and-closing operation) on the commutation switch 74 and the short-circuiting means 4 or to stop them on the basis of a short-circuiting-means electric-current detection value related to detection by malfunction detecting means 105. Furthermore, the malfunction processing unit 24 transmits a notification command signal to notification means 107 so as to make it perform, for example, notification of a malfunction by using sound or indication light.

The drive-signal generating unit 104 generates drive signals for the short-circuiting means 4 and the commutating means 7 on the basis of the output signal from the switching control means 103 and transmits the drive signals to the short-circuiting means 4 and the commutating means 7. Furthermore, for example, in order to detect a malfunction of the commutating means 7, the malfunction detecting means 105 detects electric current flowing through the short-circuiting means 4 and outputs a short-circuiting-means electric-current detection value by means of a detection signal. Although the malfunction detecting means 105 is configured to detect electric current flowing through the short-circuiting means 4 so as to detect a malfunction of the commutating means 7, the detecting method is not limited to the above. For example, electric current flowing through the backflow preventing element 5 may alternatively be detected. The notification means 107 performs the notification on the basis of the notification command signal from the malfunction processing unit 24 of the switching control means 103. The notification by the notification means 107 is not particularly limited, but may include emanating sound from, for example, a speaker or turning on, for example, an indication light.

The following description relates to an operation related to the system according to Embodiment 1 described above. In the operation performed in the power converting device according to Embodiment 1, a commutation operation in the commutating means 7 is added to an operation of a DC chopper so that the backflow preventing element 5 is reverse-recovered before the electric current flows backward from the smoothing means 8, whereby the occurrence of recovery electric current is suppressed.

Figure 4:
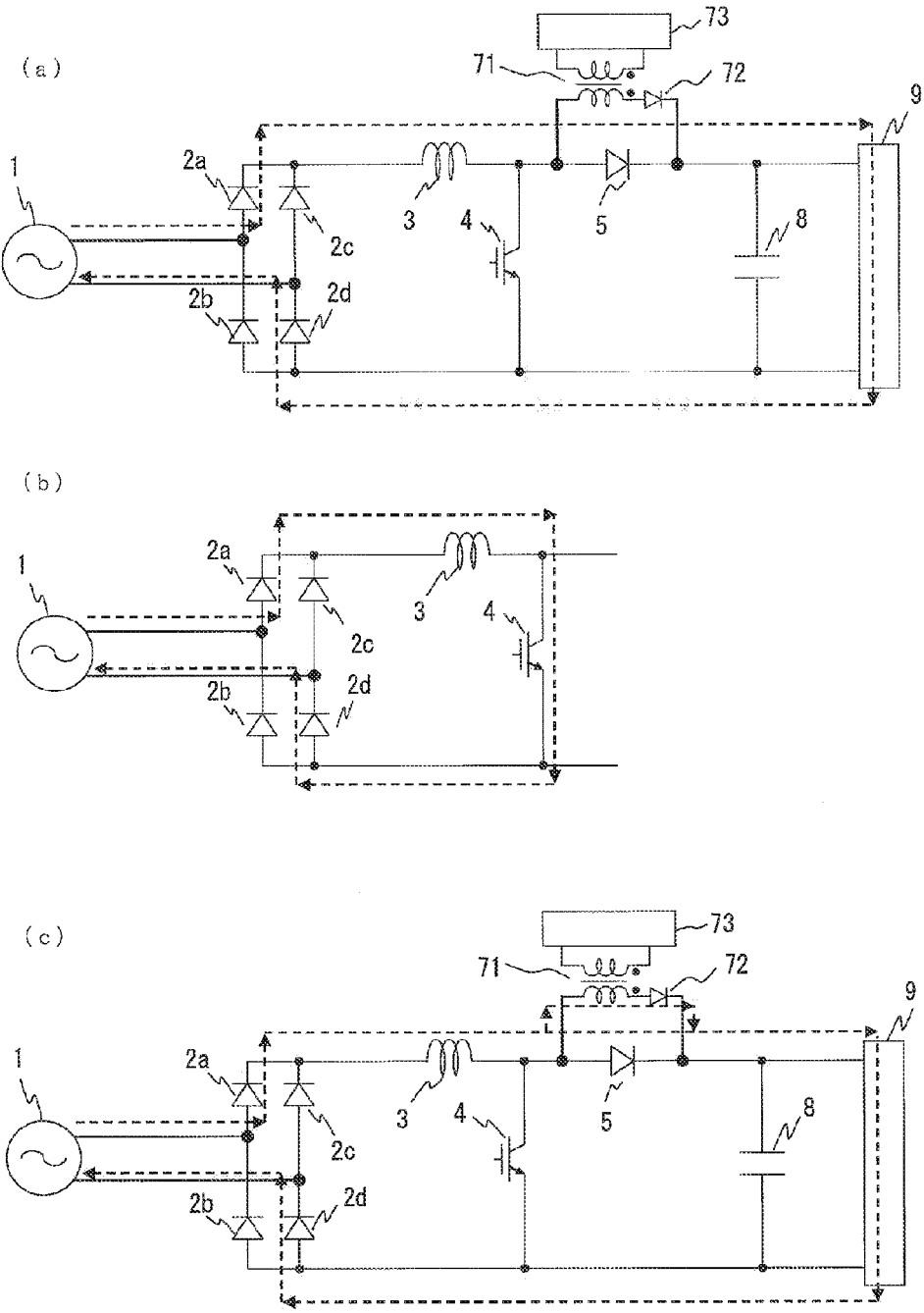
FIG. 4 illustrates examples of electric-current paths according to Embodiment 1.

FIG. 4 illustrates examples of electric-current paths according to Embodiment 1. Of various combinations of open and closed states of the short-circuiting means 4 and the commutation switch 74 within the commutating means 7, FIG. 4 shows paths according to representative operation examples.

Figure 5:
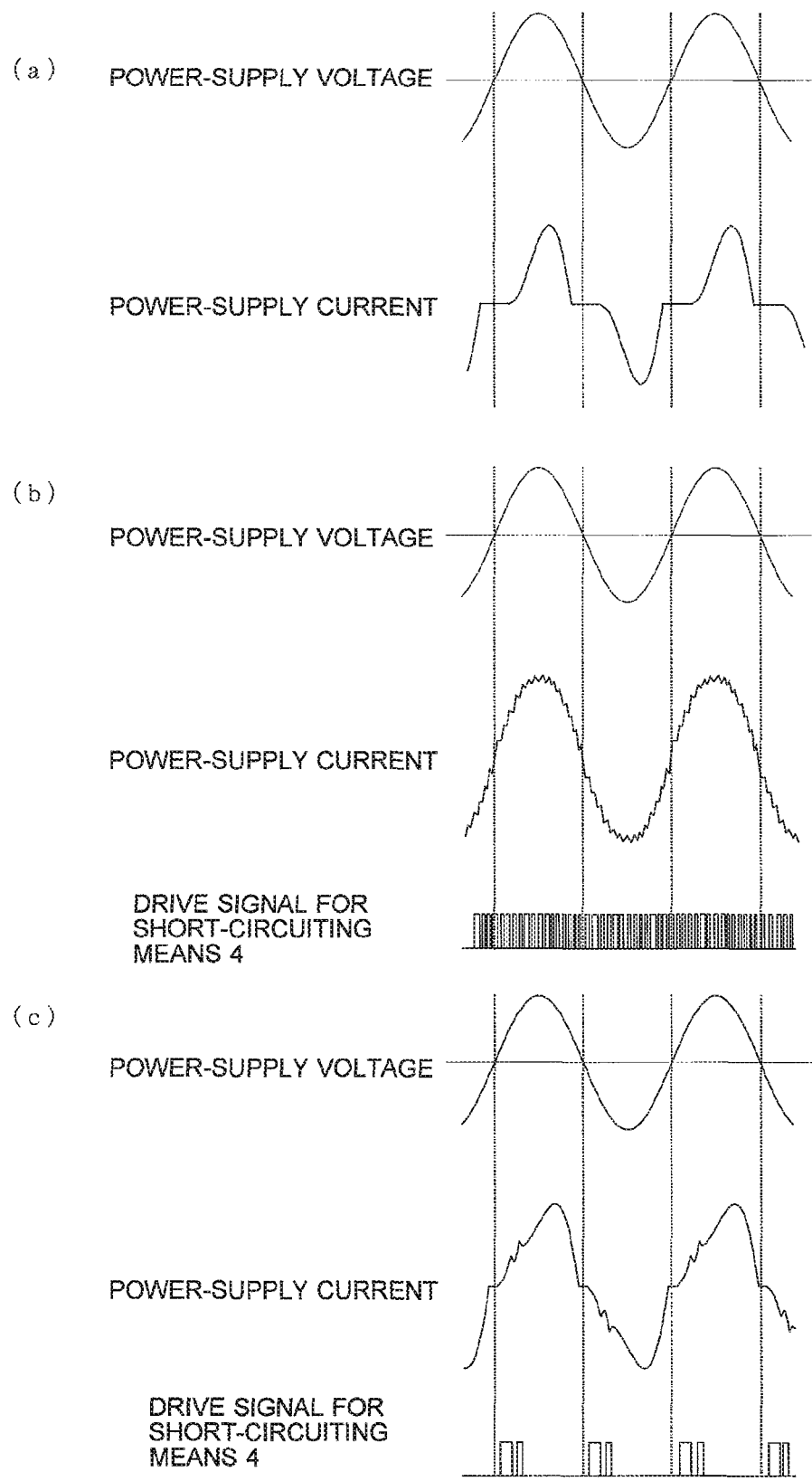
FIG. 5 illustrates examples of operation waveforms according to Embodiment 1.

FIG. 5 illustrates waveforms (i.e., operation waveforms) related to the behavior of power-supply voltage, power-supply current (i.e., input electric current), and a drive signal transmitted to the short-circuiting means 4 in accordance with the operation based on FIG. 4. The operation of the power converting device according to Embodiment 1 will now be described with reference to FIGS. 4 and 5.

FIG. 4(a) illustrates a state where the short-circuiting means 4 is switched off (i.e., opened) and the commutation switch 74 is switched off. When an operation is performed while the short-circuiting means 4 and the commutation switch 74 are maintained in the off state, a circuit equivalent to a simple full-wave rectifying circuit is obtained. For example, of the terminals of the alternating-current power supply 1, if the terminal connected to the rectifying elements 2a and 2b has the higher electric potential, an electric-current path is formed by the alternating-current power supply 1, the rectifying element 2a, the reactor 3, the backflow preventing element 5, the load 9, and the rectifying element 2d. In this case, electric current with an operation waveform as shown in FIG. 5(a) flows from the alternating-current power supply 1 as input electric current. In the case of the electric current with such a waveform, the power factor is poor, and the electric current contains a large amount of harmonic current.

FIG. 4(b) illustrates a state where the short-circuiting means 4 is switched on (i.e., closed) and the commutation switch 74 is switched off. In this case, short-circuit current flows through a path formed by the alternating-current power supply 1, the rectifying element 2a, the reactor 3, the short-circuiting means 4, and the rectifying element 2d. The voltage applied to the reactor 3 is substantially equal to the voltage of the alternating-current power supply 1, and the short-circuit current flowing through the aforementioned path is expressed by the following expression (1).

$$i\_sw4\text{on} = (Vs/L) \cdot t + i(0) \qquad (1)$$

In this case, i_sw4on denotes an electric current value when the short-circuiting means 4 is switched on, Vs denotes a voltage value of the alternating-current power supply 1, L denotes an impedance value of the reactor 3, t denotes an on-state time of the short-circuiting means 4, and i(0) denotes an electric current value (i.e., an initial value) immediately before the short-circuiting means 4 is switched on.

Normally, in full-wave rectification as in FIGS. 4(a) and 5(a), a section where electric current discharged from the smoothing means 8 flows through the load 9 has a section where the input electric current from the alternating-current power supply 1 is non-conductible. However, when the short-circuiting means 4 is switched on, since short-circuit current flows via the reactor 3, as shown in FIG. 4(b), the input electric current from the alternating-current power supply 1 flows even through the aforementioned non-conductible section. Therefore, by repeatedly switching the short-circuiting means 4 between an on-state and an off-state, the electric-current paths shown in FIGS. 4(a) and 4(b) can be repeatedly alternated. Furthermore, by controlling the time ratio between the on-state and the off-state, the waveform of the input electric current from the alternating-current power supply 1 can be transformed into an arbitrary waveform, whereby the power factor and the harmonic-current content can be improved.

For example, in the switching control means 103 having the configuration shown in FIG. 3, the bus-current-command-value computation unit 21 determines, for example, a deviation between a bus-voltage command value input from the outside and a voltage detection value from the bus-voltage detecting unit 101. Then, by performing, for example, proportional-integral control, the bus-current-command-value computation unit 21 calculates an effective bus-current command value such that the voltage detection value in the bus becomes equal to (closer to) the bus-voltage command value. The sine-wave generating unit 22 determines the frequency of the alternating-current power supply 1 from a crossing detection value of the input-voltage zero-crossing detecting unit 100 and generates a sine wave synchronized with the input voltage on the basis of the crossing detection value and the frequency of the alternating-current power supply 1. With the amplitude of the sine wave at this time being defined as 1, an absolute value of the generated sine wave is output. By multiplying the output from the bus-current-command-value computation unit 21 by the output from the sine-wave generating unit 22, a bus-current sine-wave command value is obtained. The on-duty computation unit 23 determines, for example, a deviation between the bus-current sine-wave command value obtained in the above-described manner and an electric-current detection value of the bus-current detecting unit 102. Then, by performing, for example, proportional-integral control, the on-duty computation unit 23 calculates an on-duty time of the short-circuiting means 4 such that the electric-current detection value in the bus becomes equal to (closer to) the bus-current sine-wave command value, and transmits an output signal (i.e., an on-duty signal).

The drive-signal generating unit 104, for example, compares a triangular wave having a frequency corresponding to the switching frequency of the short-circuiting means 4 with the output signal from the switching control means 103 and generates a drive signal for the short-circuiting means 4. Generally, when such control is performed, the switching frequency of the short-circuiting means 4 is about several kHz to several tens of kHz. In this case, since the aforementioned bus-current command value is given as a sine wave having a desired amplitude and having a frequency and a phase that are identical to those of the input voltage from the alternating-current power supply 1, the input electric current from the alternating-current power supply 1 can be controlled in the form of a sine wave, whereby the power factor and the harmonic-current content can be significantly improved (FIG. 5(b)).

In the above-described example, the short-circuiting means 4 is controlled by being switched at high speed and the input electric current is controlled in the form of a sine wave. However, the control method is not limited to the above. For example, if the demands for suppressing the power factor and the harmonic-current content are not high, it is not necessarily required to perform control for making the input electric current into a sine wave. For example, as shown in FIG. 5(c), the power factor and the harmonic-current content can be improved by performing control such that the short-circuiting means 4 is switched on only several times at an appropriate phase and for an appropriate on-state time in the section in which the input-current is not conducted.

For example, by comparing a harmonic regulation value with an analytic value of harmonic current contained in the input electric current and determining the phase at which the short-circuiting means 4 is switched on and the on-state time thereof within a range that satisfies the regulation value, the number of times the short-circuiting means 4 is switched can be minimized. As compared with the case where the short-circuiting means 4 is switched at a frequency of several kHz to several tens of kHz described above, the number of times the short-circuiting means 4 is switched can be significantly reduced, thereby allowing for reduction of a switching loss and reduction of generated noise. Furthermore, since an inexpensive low-speed element can be used as the short-circuiting means 4, cost reduction can also be achieved.

When such control is to be performed, for example, input voltage of the alternating-current power supply 1 may be detected, and the phase at which the short-circuiting means 4 is switched on and the on-state time thereof may be determined from, for example, zero-crossing of the input voltage. Therefore, it is not necessary to use a command value in the form of a sine wave, and the control can be simplified. Although an example in which bus voltage and bus current are controlled is described here, one of bus voltage and bus current may be controlled as an alternative example.

Figure 6:
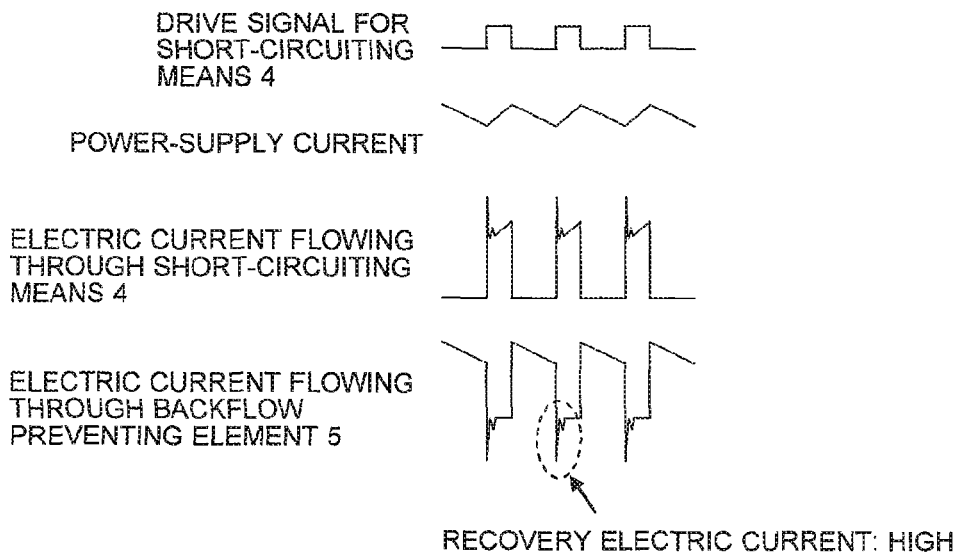
FIG. 6 illustrates an example of operation waveforms when commutation control according to Embodiment 1 is not performed.

FIG. 6 illustrates a signal and electric-current waveforms in a case where the commutating means 7 is not actuated. In FIG. 6, with regard to a drive signal for the short-circuiting means 4, the high side thereof is set as an active direction (i.e., on-state direction). As described above, when the short-circuiting means 4 is switched off, forward electric current flows through the backflow preventing element 5. When the short-circuiting means 4 is switched on in this state, a difference between bus voltage that has been smoothed by the smoothing means 8 and voltage that has been rectified by the rectifier 2 is applied to opposite ends of the series-connected backflow preventing element 5 as reverse bias voltage. Subsequently, the backflow preventing element 5 changes over to an off operation.

During the period in which the backflow preventing element 5 changes over to an off operation, short-circuit current flows in a direction opposite to that during the period in which the backflow preventing element 5 is switched on. The reason for this is as follows. In a state where forward bias voltage is steadily applied to a p-n junction diode used as the backflow preventing element 5, carriers are normally accumulated in a semiconductor of both the p-type and n-type. When reverse bias voltage is instantaneously applied in this state, the carriers move in a direction opposite to the moving direction thereof when the forward bias voltage is applied (the short-circuit current flowing in the reverse direction in this case will be referred to as "recovery electric current" hereinafter). The recovery electric current causes common-mode electric current to become displaced, causing the levels of noise terminal voltage, radiation noise, etc. to increase. This leads to an increase in cost required for noise reduction. In addition, this also leads to an increase in circuit loss.

Normally, when the current-carrying capacity of a rectifying diode increases, the number of accumulated carriers also tends to increase. Therefore, the recovery electric current increases with increasing current-carrying capacity. Furthermore, the recovery electric current increases as the applied reverse bias voltage increases.

In Embodiment 1, control (referred to as "commutation control" hereinafter) is performed by forming a commutation path with the commutating means 7 and performing reverse recovery by applying low reverse bias voltage to the backflow preventing element 5, having the large current-carrying capacity, via the transformer 71 and the commutation rectifying element 72 immediately before the short-circuiting means 4 is switched on, instead of performing reverse recovery by applying high reverse bias voltage to the backflow preventing element 5.

In commutation control, the commutation switch 74 of the commutating means 7 is switched on immediately before the short-circuiting means 4 is switched on, and the electric current flowing toward the backflow preventing element 5 via the transformer 71 is commutated to the commutation rectifying element 72 side. FIG. 4(c) illustrates a state where the short-circuiting means 4 is switched off and the commutation switch 74 is switched on. Similarly to FIG. 4(a), an electric-current path in this case is formed by the alternating-current power supply 1, the rectifying element 2a, the reactor 3, the backflow preventing element 5, the load 9, and the rectifying element 2d. Additionally, since the commutation switch 74 is switched on, the transformer 71 is excited, so that the electric current also flows into a path formed by the secondary winding of the transformer 71 and the commutation rectifying element 72 in the commutating means 7. When a certain period of time has elapsed, the electric current is completely commutated to the path at the commutation rectifying element 72 side.

Figure 7:
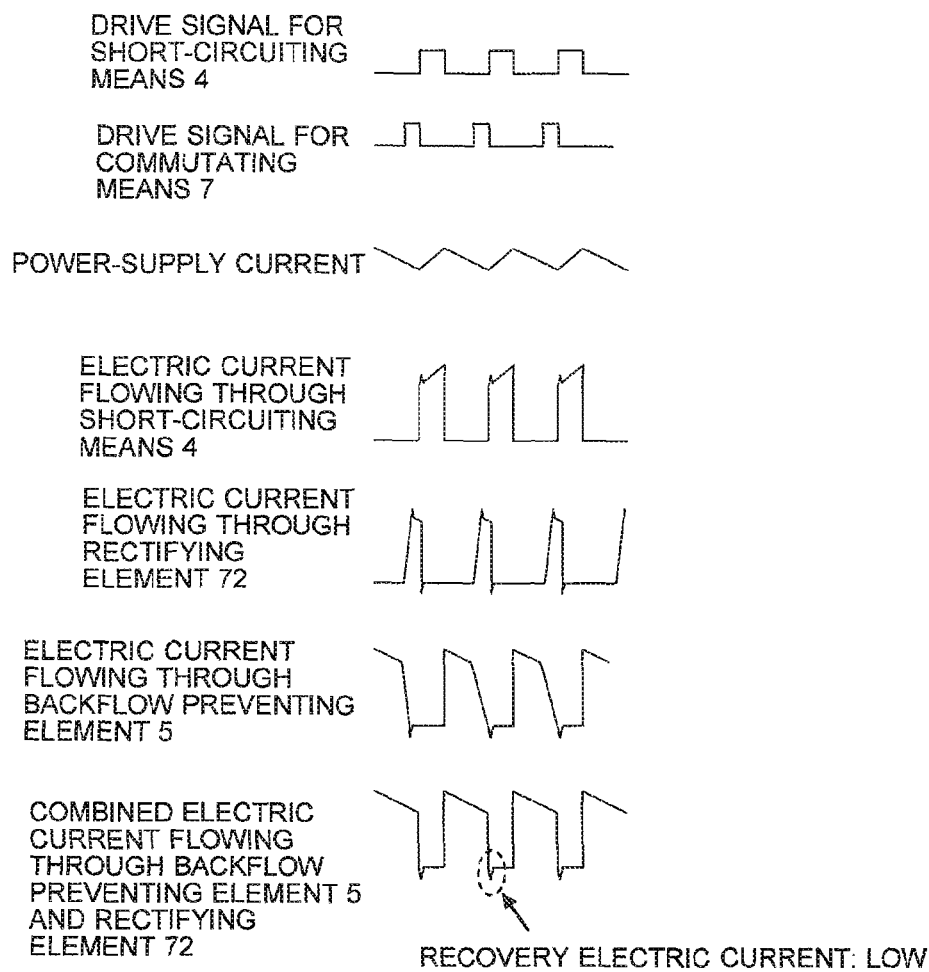
FIG. 7 illustrates an example of operation waveforms when the commutation control according to Embodiment 1 is performed.

FIG. 7 illustrates signals and electric-current waveforms in a case where the commutating means 7 is actuated. With regard to drive signals for the short-circuiting means 4 and the commutating means 7 (i.e., the commutation switch 74), the high side thereof is set as an active direction (i.e., on-state direction). As shown in FIG. 7, the drive signal for the commutating means 7 is set to an on-state immediately before the drive signal for the short-circuiting means 4 is set to an on-state. In this case, as described above, the electric current starts to flow toward the path of the secondary winding of the transformer 71 due to excitation current. Thus, the electric current flows distributively toward the backflow preventing element 5 and the commutation rectifying element 72 in the respective directions thereof. Subsequently, as the drive signal for the commutating means 7 is maintained in the on-state, the electric current no longer flows toward the backflow preventing element 5, so that the entire electric current flows toward the commutation rectifying element 72 (i.e., the commutation is completed).

When performing the commutation operation, the commutation power supply 75 within the transformer driving circuit 73 is set to a sufficiently low value, as compared with the output voltage of the smoothing means 8, so that the backflow preventing element 5 can be switched off (i.e., reverse-recovered) with low reverse bias voltage. When the short-circuiting means 4 is switched on in this state, a reverse recovery operation of the commutation rectifying element 72 is performed. In this case, recovery electric current is generated. However, since the electric-current flowing time in the commutation rectifying element 72 is extremely short, as compared with that in the backflow preventing element 5, the effective electric current of the electric current flowing through the commutation rectifying element 72 is low, meaning that the current-carrying capacity required therein may be small. Thus, a small-capacity element with a small number of accumulated carriers can be used, thereby allowing for reduction of recovery electric current, as compared with a case where recovery electric current is generated by the backflow preventing element 5 (in this case, the element is selected in view of the peak electric current). As a result, a loss and an amount of noise resulting from recovery electric current can be reduced in the overall system. Consequently, the levels of noise terminal voltage, radiation noise, etc. are reduced, and a circuit loss is suppressed. Thus, a noise filter can be reduced in size, and cost reduction can be achieved.

Furthermore, the commutation power supply 75 for the transformer driving circuit 73 can also be used as a common power supply serving as a drive power supply (i.e., a gate drive power supply, not shown) for driving the short-circuiting means 4 or a power supply (not shown) for the switching control means 103. Therefore, it is not necessary to add another power supply, so that an increase in cost can be avoided.

A Schottky barrier diode, which has good recovery characteristics, low forward voltage, a low loss, and high voltage resistant characteristics, may be used as the commutation rectifying element 72. Alternatively, a wide band-gap semiconductor element composed of SiC (silicon carbide), GaN (gallium nitride), diamond, etc. may be used. The use of these elements leads to an increase in crystal defects as well as an increase in cost as a permissible effective electric-current value becomes higher in the specifications thereof. Since an element with a low permissible effective electric-current value can be used as the commutation rectifying element 72 according to Embodiment 1, a highly-efficient power converting device with a good cost-to-performance ratio can be achieved.

Furthermore, with the intervention of the transformer 71, the backflow preventing element 5, the secondary winding of the transformer 71, and the commutation rectifying element 72 can be insulated from the transformer driving circuit 73 and the switching control means 103. Therefore, a signal for driving the commutating means 7 can be injected relatively easily. Moreover, a highly safe and reliable system can be formed.

Next, examples of failures in the commutating means 7 that performs the above-described operation, protective measures taken against such failures, and the like will be described.

First, the following description relates to a case where a short-circuit failure occurs in each component (such as each element or each unit). In a case where a short-circuit failure occurs in the primary winding of the transformer 71, the commutation power supply 75 in the transformer driving circuit 73 short-circuits when the commutation switch 74 is switched on. Thus, electric current that exceeds the current-carrying capacity of the commutation switch 74 flows therethrough, possibly causing the commutation switch 74 to break. In the case where the commutation power supply 75 is used as a common power supply for, for example, the switching control means 103, if a large amount of electric power is supplied toward the commutating means 7, the amount of electric power supplied from the commutation power supply 75 toward the switching control means 103 becomes insufficient, possibly making it difficult to perform the control properly. In this case, the commutating means 7, the power converting device, and the like are protected by, for example, interrupting the electric-current path of the transformer driving circuit 73.

Figure 8:
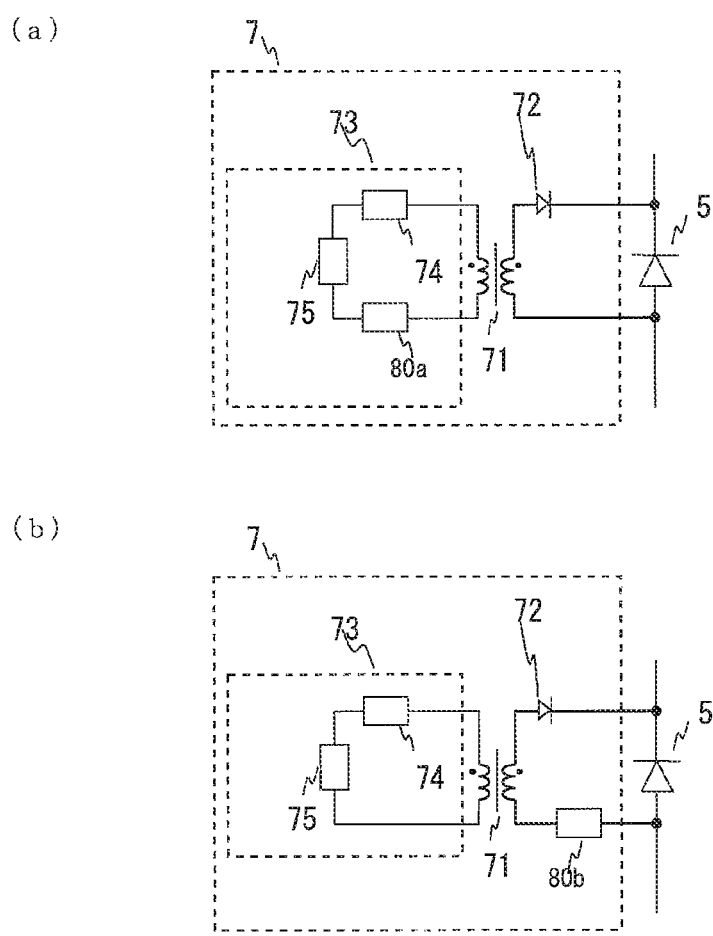
FIG. 8 illustrates configuration examples of a protection circuit in the power converting device according to Embodiment 1.

FIG. 8 illustrates configuration examples in a case where the commutating means 7 having protection means is connected in parallel with the backflow preventing element 5. For example, in the case where the electric-current path is to be interrupted, an electric-current interrupting element, such as a fuse, which blows when electric current that is lower than the current-carrying capacity of, for example, the commutation switch 74 or the commutation power supply 75 flows through the element may be inserted at a position of protection means 80a shown in FIG. 8(a). If the circuit is to be protected by suppressing electric current flowing through the transformer driving circuit 73, an electric-current suppressing element, such as a positive-temperature-coefficient thermistor, which limits electric current by utilizing a change in resistance value by self-heating when high electric current flows through the element may be incorporated into the circuit.

In this case, since the secondary winding of the commutating means 7 is not excited and a commutation operation is thus not performed, recovery electric current is not suppressed, so that the short-circuiting means 4 and the backflow preventing element 5 have operation waveforms as shown in FIG. 6. In the event of a malfunction, the electric-current path may be interrupted by, for example, switching the commutation switch 74 between on and off states based on opening-and-closing control thereof so as to open and stop the switch in accordance with the magnitude of the recovery electric current. The magnitude of the recovery electric current can be determined on the basis of, for example, a short-circuiting-means electric-current detection value related to detection by the malfunction detecting means 105. Then, determination related to protection is performed by the malfunction processing unit 24 of the switching control means 103. Furthermore, for example, if the supply of electric power to the commutation power supply 75 can be controlled, control means may stop the supply of electric power to the commutation power supply 75. In the case where the commutating means 7 is not actuated, since the input electric current and the output voltage can still be controlled by performing opening-and-closing control of the short-circuiting means 4, the opening-and-closing operation of the short-circuiting means 4 does not necessarily need to be stopped.

FIG. 9 illustrates an example of operation waveforms related to determination of whether there is a malfunction in the power converting device according to Embodiment 1. When the commutating means 7 is not actuated, an increase in recovery electric current causes the stress toward the short-circuiting means 4 and the backflow preventing element 5 to increase. Moreover, a loss in the short-circuiting means 4 and the backflow preventing element 5 also increases. Thus, it may be determined whether the opening-and-closing operation of the short-circuiting means 4 is to be performed or stopped in accordance with the magnitude of the recovery electric current. In Embodiment 1, the determination based on the magnitude of recovery electric current is performed by the malfunction processing unit 24 of the switching control means 103. For example, as shown in FIG. 9, the malfunction processing unit 24 determines whether the opening-and-closing operation of the short-circuiting means 4 is to be performed or stopped on the basis of a peak value of electric current in the short-circuiting means 4 or the backflow preventing element 5 or on the basis of a change in electric current per arbitrary time in the short-circuiting means 4 or the backflow preventing element 5. Alternatively, the determination may be performed based on a combination of any of the above. In Embodiment 1, the malfunction processing unit 24 performs the determination on the basis of a short-circuiting-means electric-current detection value related to detection by malfunction detecting means 105. The switching control means 103 transmits an output signal based on the determination by the malfunction processing unit 24.

If a short-circuit failure occurs in the commutation switch 74 connected to the primary winding of the transformer 71, a phenomenon occurs that is similar to that when a short-circuit failure occurs in the primary winding of the transformer 71. Therefore, similarly to the above, the circuit can be protected by, for example, interrupting the electric-current path with an electric-current interrupting element, such as a fuse, or suppressing electric current with an electric-current suppressing element, such as a positive-temperature-coefficient thermistor, as shown in FIG. 8(a). Furthermore, based on an assumption that a short-circuit failure may occur in the commutation switch 74, an interrupter switch for protection may be provided in advance at a similar position. In this case, the switch may normally be set in an on-state and may be switched off only when, for example, the malfunction processing unit 24 determines that there is a malfunction in accordance with the magnitude of recovery electric current. Although the interrupter switch alone is provided in this case, the interrupter switch may be provided together with, for example, the electric-current interrupting element or the electric-current suppressing element. Furthermore, the supply of electric power to the commutation power supply 75 may be stopped in accordance with the magnitude of recovery electric current. Moreover, as described above, the malfunction processing unit 24 may perform the determination and perform on-off control for the opening-and-closing operation of the short-circuiting means 4.

On the other hand, if a short-circuit failure occurs in the secondary winding of the transformer 71, the commutating means 7 is not actuated regardless of whether the commutation switch 74 is in an open or closed state. In this case, there is no problem in terms of the safety of the device regardless of whether the commutation switch 74 is in an open or closed state. However, if the opening-and-closing control of the commutation switch 74 is stopped (i.e., the commutation switch 74 is opened), the supply of electric power to the commutation power supply 75 is stopped, and an interrupter switch is provided, a loss in the transformer driving circuit 73 can be reduced by opening the switch.

Normally, with regard to diodes used as the backflow preventing element 5 and the commutation rectifying element 72, there is a tradeoff relationship between a forward voltage drop and reverse recovery characteristics. With regard to the backflow preventing element 5 and the commutation rectifying element 72 in Embodiment 1, it is desirable to select components such that a component with a low forward voltage drop is preferred for the backflow preventing element 5 and a component with fast reverse recovery characteristics is preferred for the commutation rectifying element 72. These numerical values are related to the current-carrying capacity of each element. Furthermore, since the commutation rectifying element 72 may have small current-carrying capacity, an element with a forward voltage drop and reverse recovery characteristics that are better than those of the backflow preventing element 5 can be used at a relatively low cost. For this reason, the magnitude of the forward voltage drop and the magnitude of the reverse recovery characteristics are not necessarily determined unconditionally. Therefore, by using an element with a forward voltage drop that is lower than that of the commutation rectifying element 72 as the backflow preventing element 5, even when a short-circuit failure occurs in the secondary winding of the transformer 71, the electric current becomes concentrated in the backflow preventing element 5, so that there is a low possibility of breakage of the commutation rectifying element 72 with the smaller current-carrying capacity.

However, if the forward voltage drop in the commutation rectifying element 72 is equal to or greater than that in the backflow preventing element 5, an electric-current interrupting element, such as a fuse, which blows when electric current that is lower than the current-carrying capacity of the commutation rectifying element 72 flows through the element may be inserted at a position of protection means 80b shown in FIG. 8(b). Alternatively, an electric-current suppressing element, such as a positive-temperature-coefficient thermistor, which limits electric current by utilizing a change in resistance value by self-heating when high electric current flows through the element may be incorporated. As another alternative, an interrupter switch may be incorporated. Furthermore, as described above, the malfunction detecting means 105 may perform the determination and perform on-off control for the opening-and-closing operation of the short-circuiting means 4.

If a short-circuit failure occurs in the commutation rectifying element 72 connected to the secondary winding of the transformer 71, the commutating means 7 is not actuated regardless of whether the commutation switch 74 is in an open or closed state, like in the case described above. If the opening-and-closing control of the commutation switch 74 is stopped, the supply of electric power to the commutation power supply 75 is stopped, and an interrupter switch is provided, a loss in the transformer driving circuit 73 can be reduced by stopping the opening-and-closing control.

When the commutation rectifying element 72 short-circuits, it becomes impossible to prevent backflow of electric current in this path. Therefore, the parallel-connected backflow preventing element 5 also becomes in a substantially short-circuited state and thus cannot prevent the electric current from flowing backward from the smoothing means 8 toward the power supply. Thus, when the short-circuiting means 4 is switched on, there is a possibility that overcurrent may flow and break the element. In order to prevent this, an electric-current interrupting element, an electric-current suppressing element, or an interrupter switch may be inserted into the path between the secondary winding of the transformer 71 and the commutation rectifying element 72. With regard to the operation of the interrupter switch, opening-and-closing control may be performed thereon in accordance with the magnitude of recovery electric current. The determination based on the magnitude of recovery electric current may be performed on the basis of a peak value of electric current in the short-circuiting means 4 or the backflow preventing element 5 or on the basis of a change in electric current per arbitrary time in the short-circuiting means 4 or the backflow preventing element 5, as shown in, for example, FIG. 9. Alternatively, the determination may be performed based on a combination of any of the above. The determination may be performed by, for example, the malfunction processing unit 24 of the switching control means 103.

If there is an open circuit failure in any of the primary winding of the transformer 71, the secondary winding thereof, the commutation switch 74 connected to the primary winding, and the commutation rectifying element 72 connected to the secondary winding, the commutating means 7 is not actuated, and there is no mode that may lead to problems in terms of the safety of the product. In this case, since the input electric current and the output voltage can still be controlled by performing opening-and-closing control of the short-circuiting means 4, the opening-and-closing control of the short-circuiting means 4 does not necessarily need to be stopped. However, since an increase in recovery electric current causes the stress toward the short-circuiting means 4 and the backflow preventing element 5 to increase and also causes a loss in the short-circuiting means 4 and the backflow preventing element 5 to increase, it may be determined whether the opening-and-closing control of the short-circuiting means 4 is to be performed or stopped in accordance with the magnitude of the recovery electric current. The determination based on the magnitude of recovery electric current may be performed on the basis of a peak value of electric current in the short-circuiting means 4 or the backflow preventing element 5 or on the basis of a change in electric current per arbitrary time in the short-circuiting means 4 or the backflow preventing element 5, as shown in, for example, FIG. 9. Alternatively, the determination may be performed based on a combination of any of the above.

FIG. 10 illustrates an example of a flowchart related to protection of the power converting device. With regard to the short-circuiting means 4 having, for example, a latch-based protection circuit, if it is determined that bus voltage, bus current, or electric current flowing through the short-circuiting means 4, similar to that used in the chopper circuit 6 not having the commutating means 7, exceeds a threshold value, for example, protection may be performed, in addition to the aforementioned protection, by stopping the opening-and-closing control on the short-circuiting means 4 so as to set it in an off-state. The process in FIG. 10 is performed by the malfunction processing unit 24 on the basis of a short-circuiting-means electric-current detection value (i.e., electric current flowing through the short-circuiting means 4) related to detection by the malfunction detecting means 105.

In step 1, the rate of change of the electric current flowing through the short-circuiting means 4 is compared with an arbitrarily-set threshold value. If it is determined that the electric current flowing through the short-circuiting means 4 is greater than the threshold value, the process proceeds to step 2. In step 2, a peak value of the electric current flowing through the short-circuiting means 4 is compared with an arbitrarily-set threshold value. If it is determined that the peak value of the electric current flowing through the short-circuiting means 4 is greater than the threshold value, the process proceeds to step 3. Although in the above description it is determined that there is a malfunction in step 1 and step 2 when the rate of change and the peak value of the electric current flowing through the short-circuiting means 4 exceed the respective threshold values, the physical quantities to be compared are not limited to the above. For example, the rate of change and the peak value of electric current in the backflow preventing element 5 may be used. Furthermore, for example, the physical quantities to be used for the determination may be combined, or the number of combinations may be arbitrarily changed; for example, the rate of change of the electric current flowing through the short-circuiting means 4 and the rate of change of the electric current flowing through the backflow preventing element 5 may be used as the physical quantities to be compared.

If a protection operation is to be performed and the short-circuiting means 4 is to be switched off in step 4, it is determined in step 3 whether there is a reset signal for a latch so as to determine whether the latch is to be set for arbitrarily resetting the protection operation. If it is determined that there is no reset signal, the process proceeds to step 4 where the latch for arbitrarily resetting the protection operation is set such that the short-circuiting means 4 is switched off, as described above.

After step 4, the process proceeds again to step 3 where it is determined whether there is a reset signal for the latch. If there is a reset signal, the process proceeds to step 5 where the protection operation is reset so that the opening-and-closing control of the short-circuiting means 4 can be performed. Then, the process proceeds again to step 1 where it is determined whether or not the protection operation is necessary.

If bus voltage, bus current, or electric current flowing through the short-circuiting means 4, similar to that used in a normal chopper circuit not having the normal commutating means 7, exceeds the threshold value, a similar process is performed. In the flow of the process, it is determined whether or not the protection operation is necessary. If the protection operation is necessary, the short-circuiting means 4 is switched off. Although in the above description it is determined that there is a malfunction in step 1 and step 2 when the rate of change and the peak value of the electric current flowing through the short-circuiting means 4 exceed the respective threshold values, the bus voltage, the bus current or the electric current flowing through the short-circuiting means 4 may be compared with respective arbitrary threshold values concurrently with step 1 and step 2. In this case, the process from step 3 and onward can be the same. If an interrupter switch is provided as protection means 80, it may be determined whether or not the operation of the interrupter switch is necessary in accordance with the above-described procedure. Although the process is performed by the malfunction processing unit 24, a similar effect can be achieved by performing the process by using hardware equipped with a comparator or a flip-flop circuit.

Accordingly, the power converting device according to Embodiment 1 is provided with the commutating means 7 so that electric current flowing through the backflow preventing element 5 can be commutated to a different path. Thus, when electric current flows backward from the load 9 side, recovery electric current generated in the backflow preventing element 5 is reduced so that, for example, loss reduction and noise-terminal-voltage level reduction can be achieved and EMC can be coped with, whereby increased efficiency can be achieved in the overall system. Furthermore, when a failure occurs in a component, such as an element constituting the commutating means 7, and malfunction detecting means 106 detects a malfunction of the commutating means 7, the malfunction processing unit 24 of the switching control means 103 performs operation control related to protection of at least one of the commutating means 7 and the short-circuiting means 4, whereby a highly-reliable device can be obtained. According to circumstances, the short-circuiting means 4 may be stopped so that a highly-reliable device with, for example, a circuit protecting function can be obtained. Even if the commutating means 7 were to be stopped, the power converting device can still maintain its operation unless the operation of the short-circuiting means 4 is stopped, whereby the device can perform necessary operations while ensuring safety.

When the protection is to be performed, since the protection means 80*a* or 80*b* that can interrupt the electric-current path of at least one of the primary winding and the secondary winding of the transformer 71 is provided, the commutating means 7 and the power converting device can be effectively protected. Furthermore, with the notification means 107, notification of a malfunction of the commutating means 7 can be provided.

Furthermore, because the commutating means 7 is constituted of, for example, the transformer 71, the transformer 71 can insulate the backflow preventing element 5, the secondary winding of the transformer 71, and the commutation rectifying element 72, which are disposed on the circuit between the alternating-current power supply 1 and the load 9, from the transformer driving circuit 73, the switching control means 103, and the drive signal for the commutating means 7, so that the transmission of the drive signal toward the commutating means 7 can be performed relatively easily. Moreover, means to which high voltage is applied and means actuated with low voltage can be electrically isolated from each other. Furthermore, a highly safe and reliable system can be formed. By setting the commutation power supply 75 of the transformer driving circuit 73 to a sufficiently low value, as compared with the output voltage of the smoothing means 8, the backflow preventing element 5 can be reverse-recovered with low reverse bias voltage.

Furthermore, since a wide band-gap semiconductor composed of a silicon-carbide-based material, a gallium-nitride-based material, or diamond is used as the commutation rectifying element 72, a low-loss power converting device can be obtained. Moreover, due to a low electric-power loss, increased efficiency of the element can be achieved. Because a wide band-gap semiconductor has a high permissible electric-current density, the element can be reduced in size, and the means having the element built therein can also be increased in size. If there is no loss in the entire system including, for example, the commutation switch 74, in addition to the commutation rectifying element 72, a wide band-gap semiconductor may be used for another element.

Embodiment 2

FIG. 11 illustrates a configuration example of a power converting device according to Embodiment 2. In FIG. 11, units, elements, and the like that are similar to those in Embodiment 1 are given the same reference numerals. In the chopper circuit 6 in FIG. 11, a chopper circuit constituted of a reactor 3*b*, short-circuiting means 4*b*, and a backflow preventing element 5*b* is connected in parallel with a chopper circuit constituted of a reactor 3*a*, short-circuiting means 4*a*, and a backflow preventing element 5a. The backflow preventing elements 5a and 5b are connected to the commutating means 7. Therefore, in Embodiment 2, the commutating means 7 is shared by the two chopper circuits.

The switching control means 103 has, for example, the configuration shown in FIG. 3 and calculates on-duty times of the short-circuiting means 4a and 4b in a manner similar to that in Embodiment 1. The on-duty times of the short-circuiting means 4a and 4b are set to identical values. Subsequently, the drive-signal generating unit 104 generates drive signals for driving the short-circuiting means 4a and 4b on the basis of an output signal from the switching control means 103. In this case, the drive signals to be transmitted to the short-circuiting means 4a and 4b have different phases. For example, although the phase difference is not limited in particular, the phase difference may be 180°.

The chopper circuit 6 in Embodiment 2 includes two parallel-connected chopper circuits each constituted of a reactor 3, short-circuiting means 4, and a backflow preventing element 5. As compared with a case where the chopper circuit is a single system as in Embodiment 1, the electric current flowing into the individual chopper circuits is distributed thereto so that the current-carrying capacity of each component can be reduced. Although the number of elements is increased, the total cost and the circuit size can be reduced.

FIG. 12 illustrates, for example, waveforms (i.e., operation waveforms) related to the behavior of power-supply voltage, power-supply current (i.e., input electric current), and drive signals transmitted to the short-circuiting means 4 in accordance with Embodiment 2. By driving the short-circuiting means 4a and 4b with drive signals having different phases, ripples contained in the power-supply current, which is the total electric current flowing through the systems, are counterbalanced and reduced, as shown in FIGS. 12(*a*) and 12(*b*). Although FIG. 12(*b*) shows an example of a continuous mode in which the reactor current does not reach zero in each switching cycle, a discontinuous mode or a critical mode in which the reactor current reaches zero in each switching cycle is also permissible. In this case, because inductance values required in the reactors 3a and 3b become smaller, cost reduction and size reduction can be achieved. With the electric current reaching zero in each switching cycle, soft switching in which switching is performed in a state where the electric current is zero is performed in the subsequent switching operation. Therefore, reduction of a switching loss is also achieved. In addition, since the ripple in the power-supply current is reduced, a noise filter can be reduced in size, and cost reduction can be achieved. By utilizing the fact that the ripple in the power-supply current is reduced, the switching frequency in each system may be reduced. In this case, even though the ripple reduction effect in the power-supply current becomes lower, a switching loss can be reduced since the number of times switching is performed in each system is reduced.

Although the above example is directed to a case where two chopper circuits constituted of reactors 3, short-circuiting means 4, and backflow preventing elements 5 are connected in parallel, the chopper circuit 6 may be constituted of three or more parallel-connected chopper circuits. In this case, an effect similar to the above can be achieved by varying the phase difference among the systems. Although the number of elements is increased with the increased number of systems, the ripple in the power-supply current and the electric current flowing through each system can be further reduced. The effect for counterbalancing the ripples is maximized by setting the phase difference to 360°/n when the number of systems is equal to n.

In the operation of the power converting device having the above-described configuration, recovery electric current is generated at the backflow preventing element 5a when the short-circuiting means 4a is switched on and at the backflow preventing element 5b when the short-circuiting means 4b is switched on in accordance with a mechanism similar to that in Embodiment 1. Thus, the timing at which recovery electric current is generated varies. Therefore, in the commutating means 7 according to Embodiment 2, a secondary winding of the transformer 71 that is connected to the backflow preventing element 5a and a secondary winding of the transformer 71 that is connected to the backflow preventing element 5b need to be operated at different timings.

FIG. 13 illustrates a configuration example of the commutating means 7 according to Embodiment 2. The secondary winding of the transformer 71 that is connected to a commutation rectifying element 72a and the secondary winding of the transformer 71 that is connected to a commutation rectifying element 72b are given opposite polarities and are reversely wound. The transformer driving circuit 73 is constituted of commutation switches 74a and 74b, the commutation power supply 75, and capacitors 76a and 76b.

In the commutating means in FIG. 13, when the commutation switch 74a is switched on and the commutation switch 74b is switched off, the capacitor 76a discharges electricity so that excitation current flows through the primary winding of the transformer 71. In this case, in the secondary windings of the transformer 71, electric current flows through the winding located at the commutation rectifying element 72a side and having the same polarity, and the commutation rectifying element 72a commences a commutation operation. On the other hand, when the commutation switch 74a is switched off and the commutation switch 74b is switched on, the capacitor 76b discharges electricity so that excitation current flows through the primary winding of the transformer 71 in a direction opposite to that when the commutation switch 74a is switched on and the commutation switch 74b is switched off. In this case, in the secondary windings of the transformer 71, electric current flows through the winding located at the commutation rectifying element 72b side and having the opposite polarity, and the commutation rectifying element 72b commences a commutation operation. Although the transformer driving circuit 73 is described above with reference to an example in which the commutation switches 74a and 74b constitute a half-bridge configuration, a similar operation can be performed and a similar effect can be achieved with, for example, a full-bridge configuration by increasing the number of switches.

According to Embodiment 2, even in the case where the commutating means 7 is installed for each of the backflow preventing elements 5a and 5b that require commutation operations at different timings, the transformer driving circuit 73 formed at the primary winding side of the transformer 71 can be shared by the elements. Therefore, the number of components in the circuit can be reduced while noise reduction and loss reduction are achieved due to reduction of recovery electric current, as in Embodiment 1, thereby reducing the circuit area and suppressing an increase in cost. As an alternative to varying the timings, for example, the time in which a commutation operation is performed may be adjusted.

The following description relates to a failure mode of the commutating means 7 that performs the above-described operation and protection thereof during that mode. Since failures occurring in the primary winding of the transformer 71, the secondary windings thereof, the commutation rectifying elements 72a and 72b, and the commutation switches 74a and 74b are similar to those in Embodiment 1, protection that is similar to that described with reference to FIGS. 8 to 10 in Embodiment 1 can be performed.

If a short-circuit failure occurs in the capacitor 76a, since excitation current does not flow toward the primary winding of the transformer 71 when the commutation switch 74a is switched on, a commutation operation cannot be performed at the commutation rectifying element 72a side. On the other hand, the capacitor 76b is charged with voltage, which is twice as high as that in the normal mode, directly from the commutation power supply 75. Therefore, when the commutation switch 74b is switched on, excitation current flows through the primary winding of the transformer 71, so that a commutation operation can be performed at the commutation rectifying element 72b side. However, the voltage applied to the transformer 71 in this case is twice as high as that in the normal mode, as mentioned above. Thus, by delaying the timing for switching on the commutation switch 74b or by performing adjustment to reduce the pulse width of the drive signal, the electric current flowing through the primary winding of the transformer 71 can be suppressed to the same level as that in the normal mode, thereby suppressing stress applied to the transformer 71.

If a short-circuit failure occurs in the capacitor 76b, a phenomenon occurs that is similar to that when a short-circuit failure occurs in the capacitor 76a. In this case, since excitation current does not flow toward the primary winding of the transformer 71 when the commutation switch 74b is switched on, a commutation operation cannot be performed at the commutation rectifying element 72b side. On the other hand, the capacitor 76a is charged with voltage, which is twice as high as that in the normal mode, directly from the commutation power supply 75. Therefore, when the commutation switch 74a is switched on, excitation current flows through the primary winding of the transformer 71, so that a commutation operation can be performed at the commutation rectifying element 72b side. However, the voltage applied to the transformer 71 in this case is twice as high as that in the normal mode, as mentioned above. Thus, by delaying the timing for switching on the commutation switch 74a or by performing adjustment to reduce the pulse width of the drive signal, the electric current flowing through the primary winding of the transformer 71 can be suppressed to the same level as that in the normal mode, thereby suppressing stress applied to the transformer 71.

If there is an open circuit failure in the capacitor 76a, the capacitor 76b is charged while the commutation switch 74a is switched on. Until the capacitor 76b is sufficiently charged, excitation current does not sufficiently flow to the primary winding of the transformer 71 even if the commutation switch 74b is switched on. Therefore, a commutation operation cannot be performed at the commutation rectifying element 72b side. In such a case, for example, the notification means 107 may notify a user or the like that there is a malfunction and prompt the user or the like to stop or repair the power converting device. During that time, control may be performed for making the device continue its operation. The notification provided by, for example, the notification means is not limited to the above-described case. For example, notification may be provided by the notification means when there is a failure in, for example, the commutating means 7 due to, for example, other causes.

If there is an open circuit failure in the capacitor 76b, a phenomenon occurs that is similar to that when there is an open circuit failure in the capacitor 76a. In this case, the capacitor 76a is charged while the commutation switch 74b is switched on. Until the capacitor 76a is sufficiently charged, excitation current does not sufficiently flow to the primary winding of the transformer 71 even if the commutation switch 74a is switched on. Therefore, a commutation operation cannot be performed at the commutation rectifying element 72a side. In such a case, for example, notification is provided by, for example, notification means (not shown). During that time, control may be performed for making the device continue its operation.

FIG. 14 illustrates another configuration example of the power converting device according to Embodiment 2. For example, the following description relates to a case where the commutating means 7 at the backflow preventing element 5a side or the backflow preventing element 5b side is inoperable due to a failure of a component. Determination of whether the commutating means 7 in each system is operable or inoperable may be performed on the basis of, for example, a process similar to that in the flowchart shown in FIG. 10 by using the electric-current peak values or the rates of change of electric current flowing through the short-circuiting means 4a and 4b and the backflow preventing elements 5a and 5b or by using a combination of multiple items selected from the above. Based on the determination result, the operation of the short-circuiting means 4a and 4b may be stopped. In this case, as shown in FIG. 14, interrupter switches 106a and 106b, such as relay units, may be provided at the rear side of the backflow preventing elements 5a and 5b (i.e., on paths between the backflow preventing elements 5a and 5b and the smoothing means 8) such that the paths can be interrupted.

FIG. 15 illustrates the relationship between the operability of the commutating means 7 and the load. For example, as shown in FIG. 15, it may be determined whether the short-circuiting means 4a and 4b are to be actuated or stopped in accordance with a combination of the operability of the commutating means 7 and the load. In this case, it is assumed that a motor is driven in an inverter circuit serving as the load. Furthermore, the backflow preventing elements 5a and 5b are individually connected to multiple independent commutating means 7.

For example, if the load is small, since the bus voltage does not need to be boosted, the short-circuiting means 4a and 4b are stopped when the load is small. In this case, since the chopper circuit 6 is not actuated, the device behaves in a manner similar to that of a capacitor-input-type converter. Because the load is small, the electric current does not exceed the current-carrying capacity of each element even when either of the interrupter switches 106a and 106b is interrupted. Therefore, there is no risk of breakage. In addition, the number of elements through which the electric current passes during power conversion can be reduced, thereby allowing for loss reduction.

On the other hand, when the load is large, in order to improve the efficiency by boosting the bus voltage to expand the operating region of the motor or by increasing the number of turns in the motor, it is preferable that the short-circuiting means 4a and 4b be actuated as much as possible. In this case, if commutating means 7a and commutating means 7b are inoperable, the operation of the short-circuiting means 4 at the inoperable side of the commutating means 7 is stopped, and the paths are interrupted by using the interrupter switches 106a and 106b. In this case, similarly to the above, the number of elements through which the electric current passes during power conversion can be reduced, thereby allowing for loss reduction. However, since the electric current that is normally distributed becomes concentrated in each element at the non-interrupted side, if the electric current exceeds the current-carrying capacity, it is desirable that the device be made to operate as a capacitor-input-type converter by stopping the operation of the short-circuiting means 4.

Accordingly, with the power converting device according to Embodiment 2, for example, even in the case where commutation operations are to be performed at different timings for the backflow preventing elements 5a and 5b, the secondary windings of the transformer 71 and the commutation rectifying elements 72a and 72b are respectively connected in parallel with the backflow preventing elements 5a and 5b, as in Embodiment 1, and can share the transformer driving circuit 73 that controls the supply of power to the primary winding of the transformer 71, so that the number of components in the circuit can be reduced while noise reduction and loss reduction are achieved due to reduction of recovery electric current, as in Embodiment 1, thereby reducing the circuit area and suppressing an increase in cost.

Furthermore, for example, when a short-circuit failure occurs in one of the capacitors 76, the electric current flowing through the primary winding of the transformer 71 can be suppressed to the same level as that in the normal mode by delaying the timing for switching on the corresponding commutation switch 74 or by performing adjustment to reduce the pulse width (i.e., the on-state time, the on-duty time) of the drive signal, thereby suppressing stress applied to the transformer 71.

Embodiment 3

Figure 16:
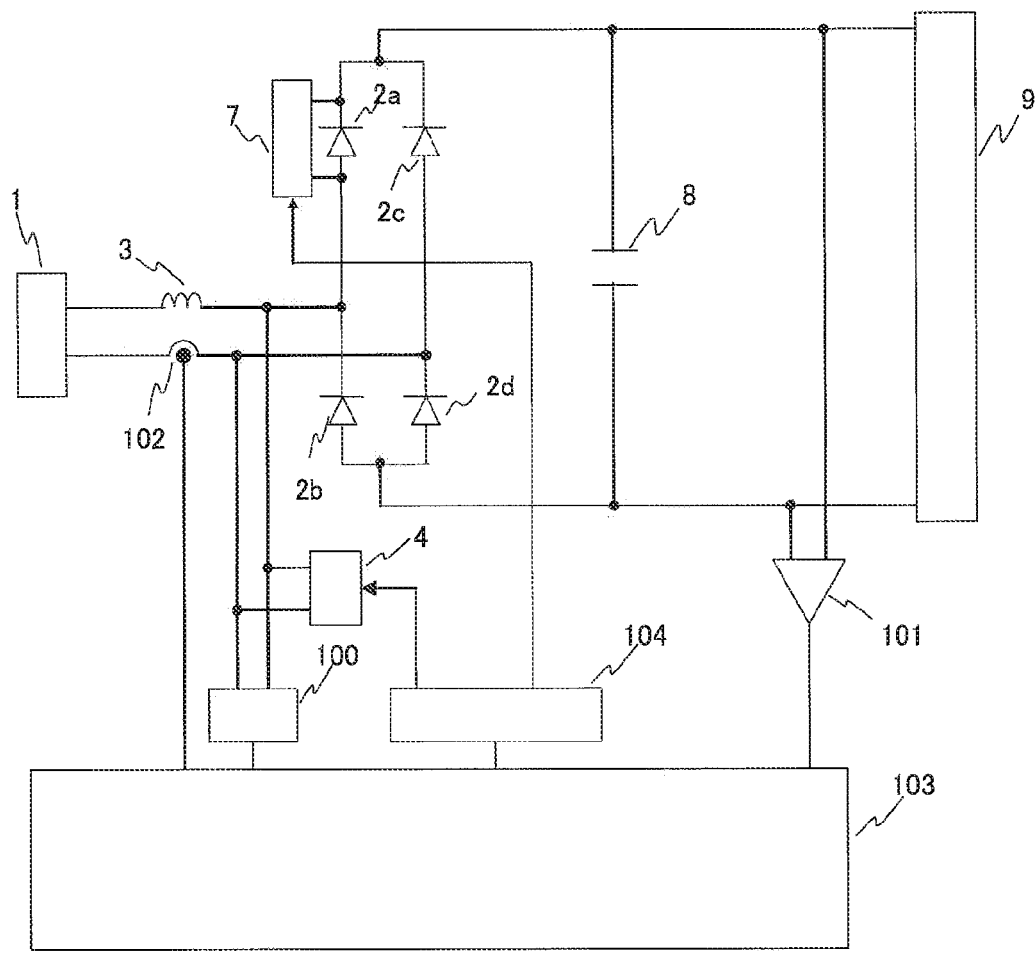
FIG. 16 illustrates a configuration example of a power converting device according to Embodiment 3.

FIGS. 16 to 30 illustrate configuration examples of a power converting device according to Embodiment 3 of the present invention. Means, elements, and the like that perform operations similar to those in the drawings described in, for example, Embodiment 1 are given the same reference numerals. The power converting device described in each of Embodiment 1 and Embodiment 2 described above is connected to a single-phase alternating-current power supply and is provided with short-circuiting means at the rear side of where the supplied electric power is rectified. Alternatively, a power converting device corresponding to a single-phase alternating-current power supply, as shown in, for example, FIGS. 16 to 30, may be provided with the commutating means 7 and perform commutation control so that an effect similar to the above is achieved. Thus, even when a failure occurs in this commutating means 7, the device can be protected, whereby improved reliability can advantageously be achieved. In this case, the commutating means 7 may be provided with the rectifying element 2a or the like as a backflow preventing element, as shown in, for example, FIG. 16.

Figure 17:
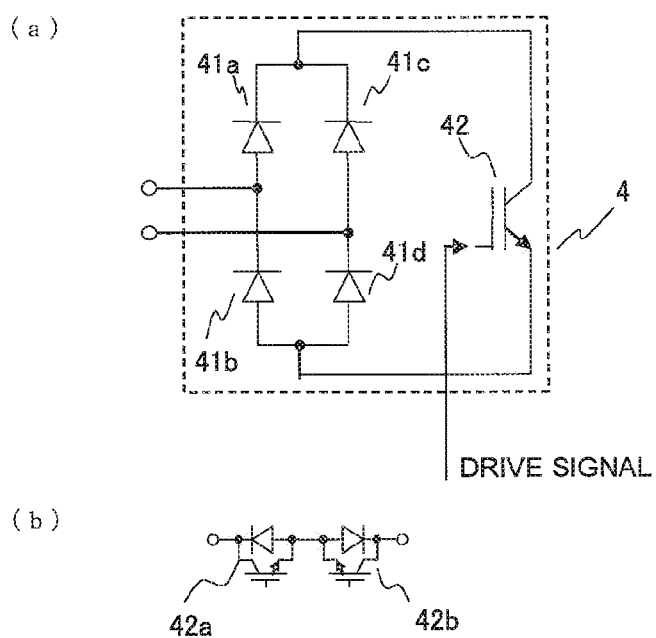
FIG. 17 illustrates the configuration example of the power converting device according to Embodiment 3.
Figure 18:
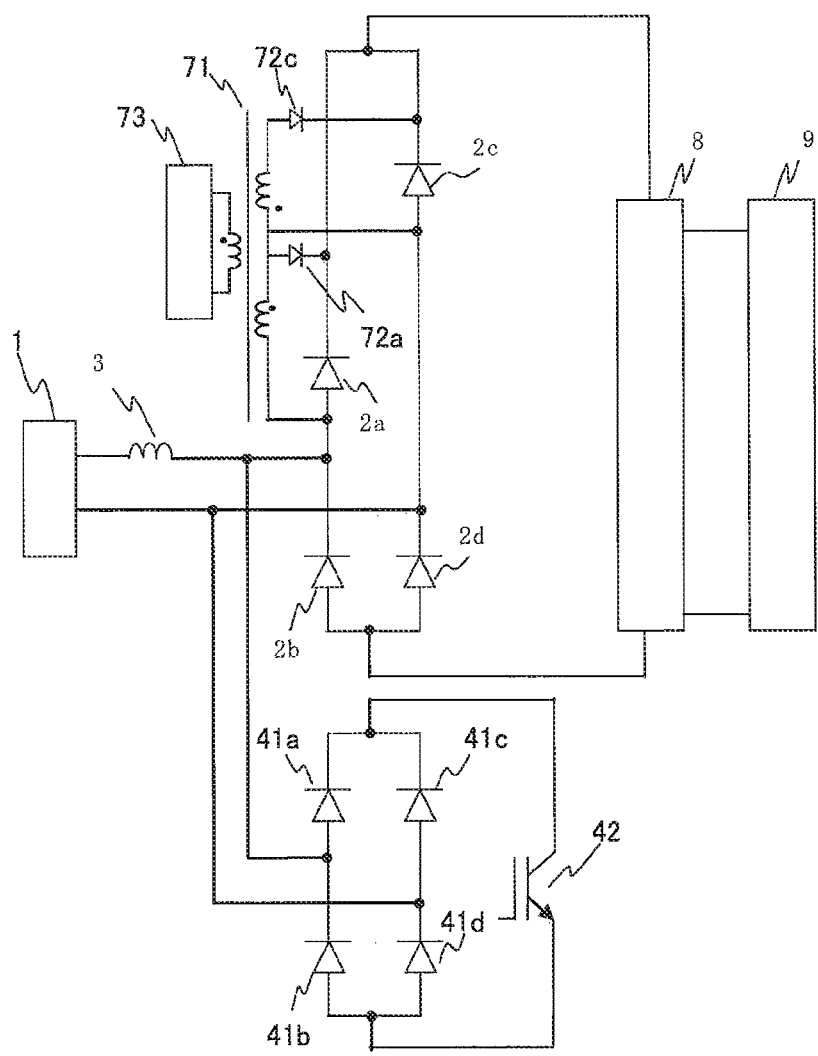
FIG. 18 illustrates another configuration example of the power converting device according to Embodiment 3.
Figure 19:
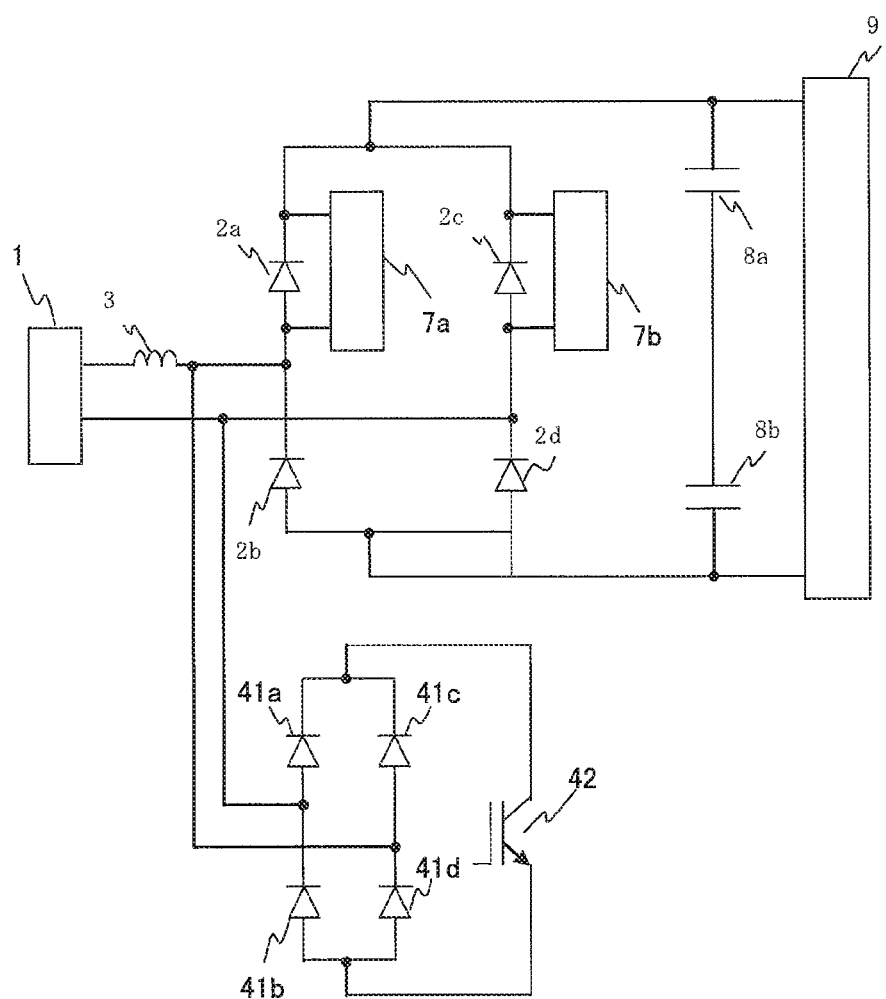
FIG. 19 illustrates another configuration example of the power converting device according to Embodiment 3.
Figure 20:
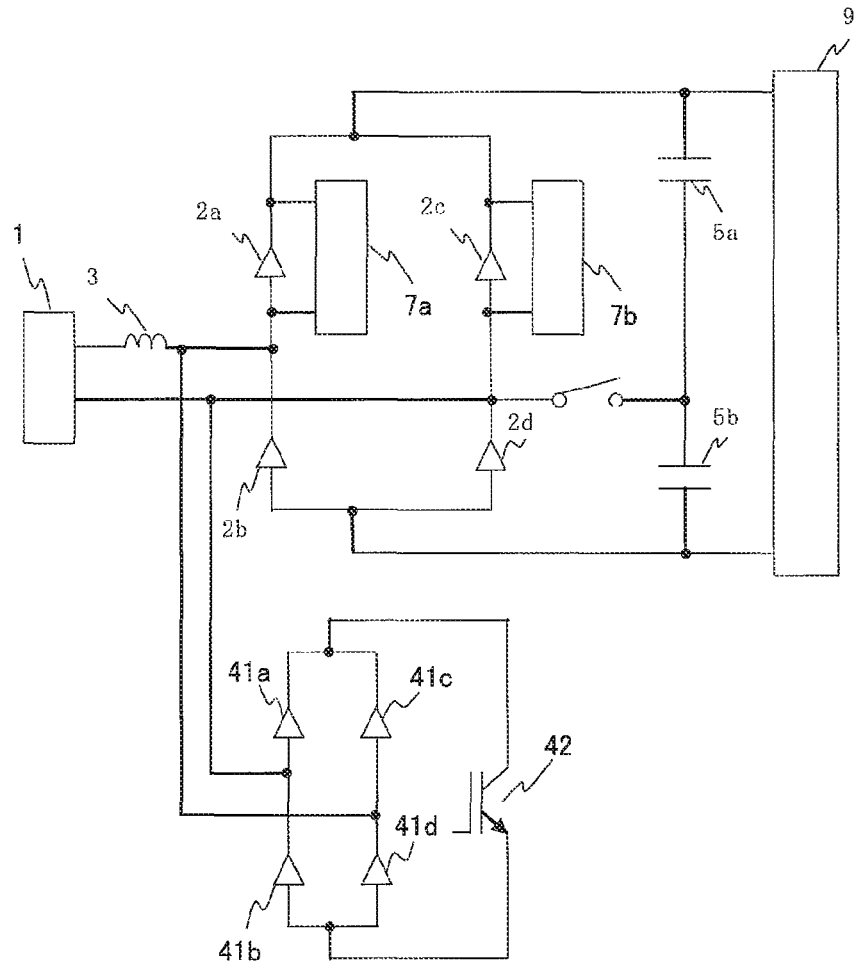
FIG. 20 illustrates another configuration example of the power converting device according to Embodiment 3.
Figure 21:
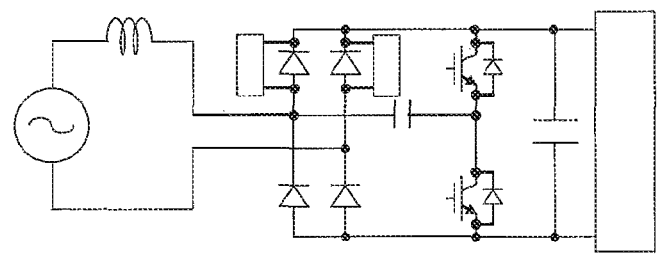
FIG. 21 illustrates another configuration example of the power converting device according to Embodiment 3.
Figure 22:
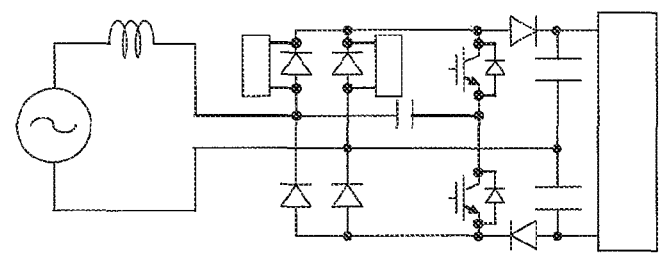
FIG. 22 illustrates another configuration example of the power converting device according to Embodiment 3.
Figure 23:
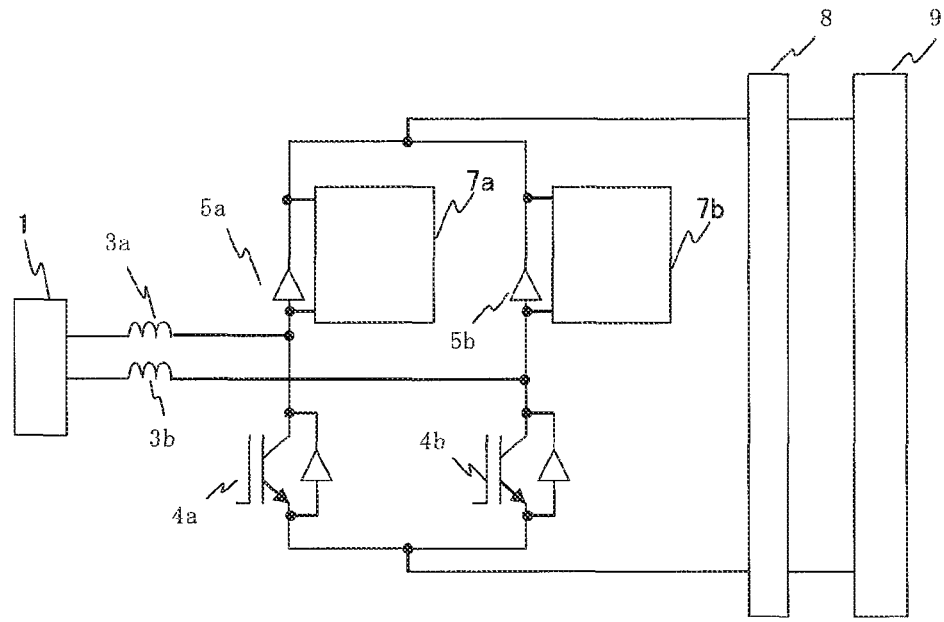
FIG. 23 illustrates another configuration example of the power converting device according to Embodiment 3.
Figure 24:
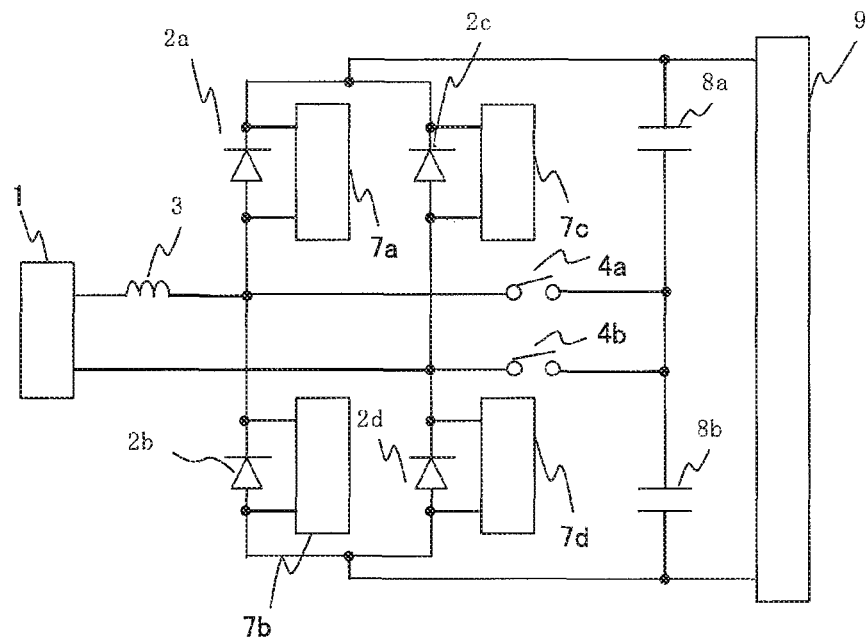
FIG. 24 illustrates another configuration example of the power converting device according to Embodiment 3.
Figure 29:
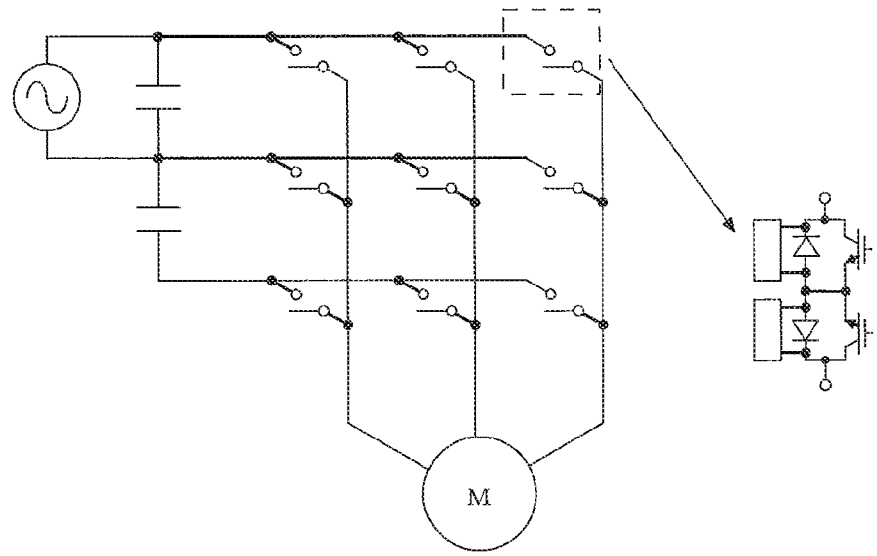
FIG. 29 illustrates another configuration example of the power converting device according to Embodiment 3.
Figure 30:
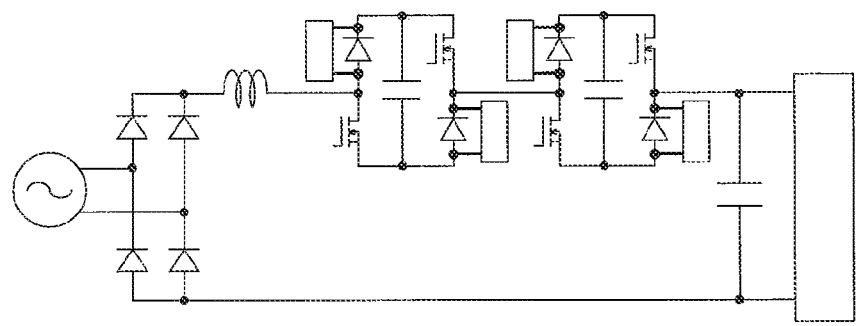
FIG. 30 illustrates another configuration example of the power converting device according to Embodiment 3.
Figure 31:
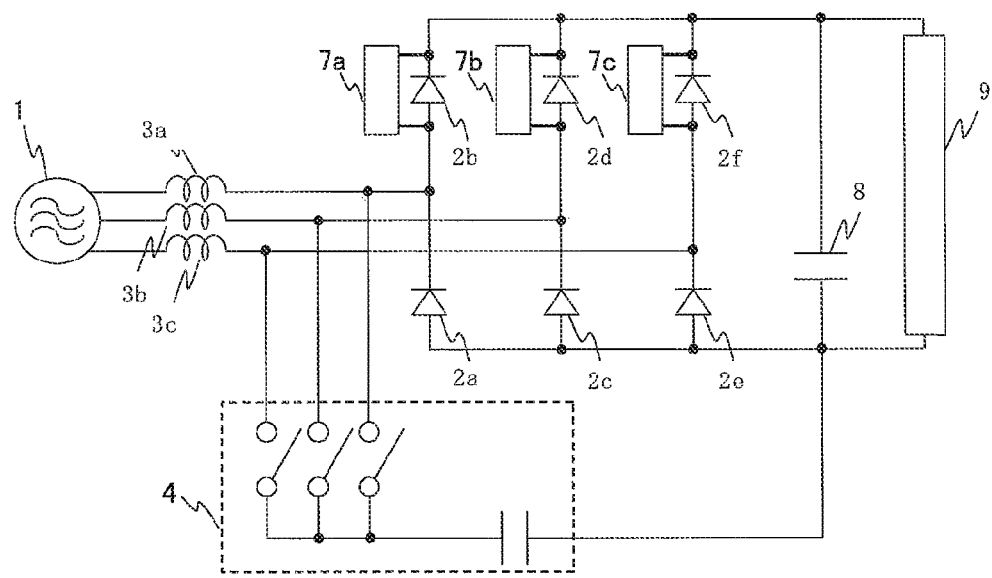
FIG. 31 illustrates a configuration example of a power converting device according to Embodiment 4.
Figure 32:
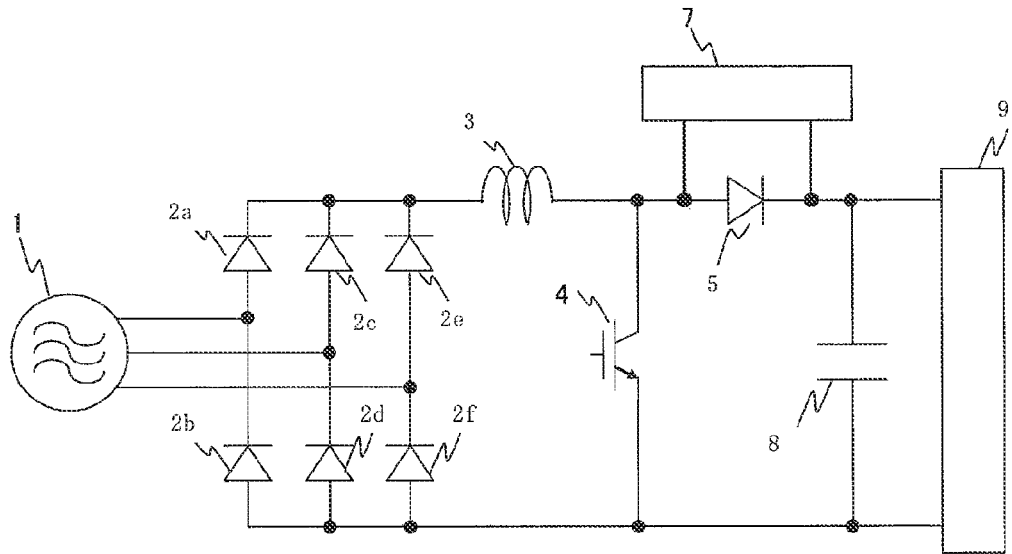
FIG. 32 illustrates another configuration example of the power converting device according to Embodiment 4.
Figure 33:
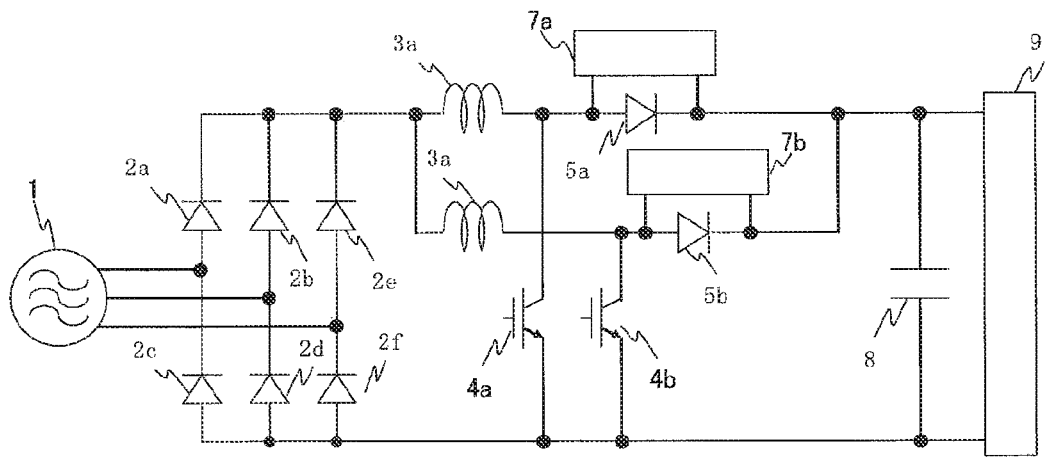
FIG. 33 illustrates another configuration example of the power converting device according to Embodiment 4.
Figure 34:
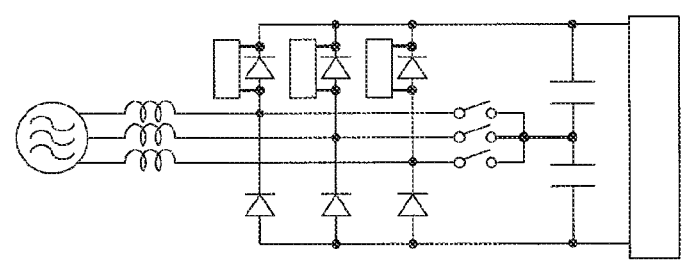
FIG. 34 illustrates another configuration example of the power converting device according to Embodiment 4.
Figure 35:
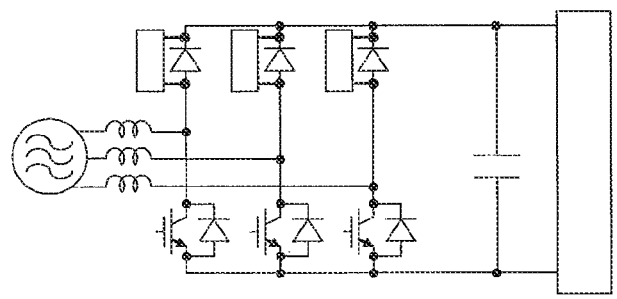
FIG. 35 illustrates another configuration example of the power converting device according to Embodiment 4.
Figure 36:
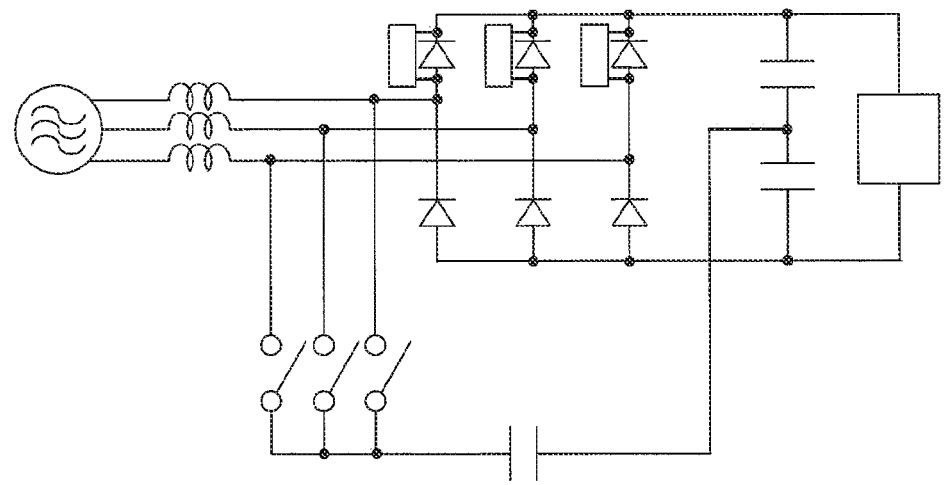
FIG. 36 illustrates another configuration example of the power converting device according to Embodiment 4.
Figure 37:
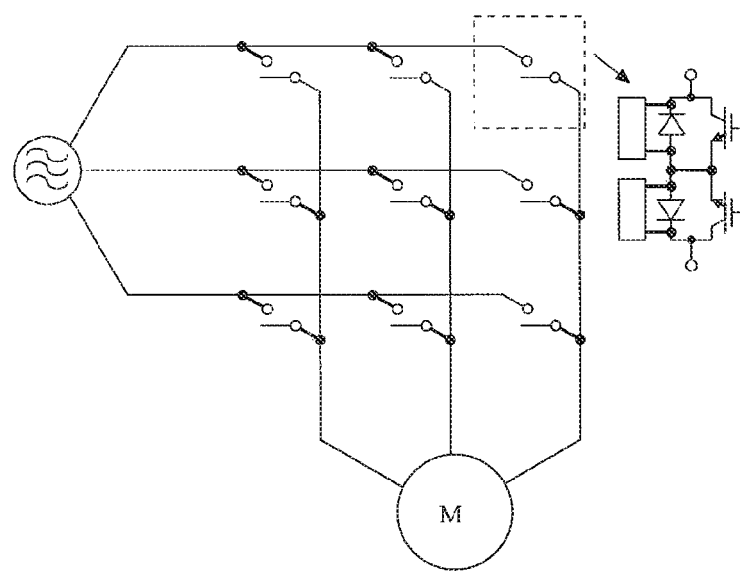
FIG. 37 illustrates another configuration example of the power converting device according to Embodiment 4.
Figure 38:
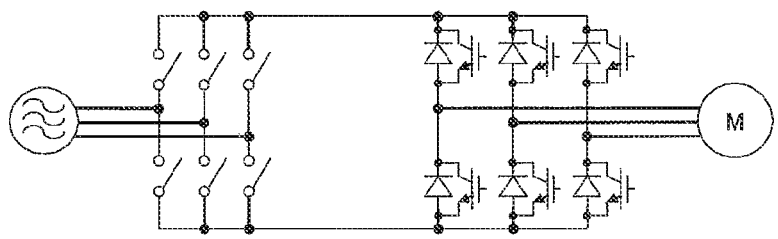
FIG. 38 illustrates another configuration example of the power converting device according to Embodiment 4.
Figure 39:
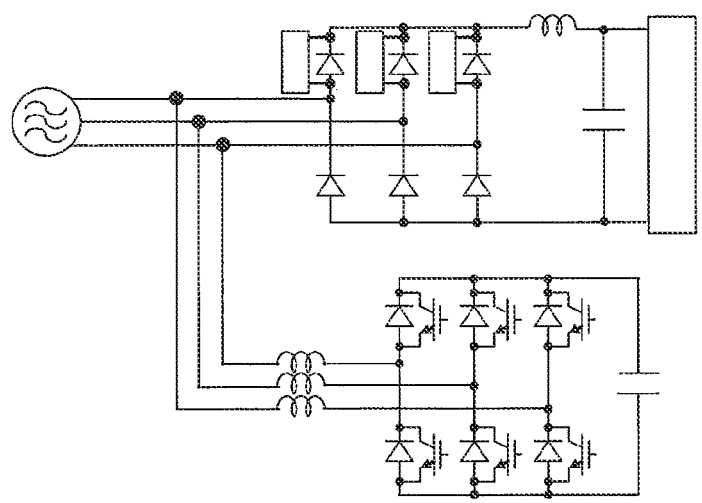
FIG. 39 illustrates another configuration example of the power converting device according to Embodiment 4.
Figure 40:
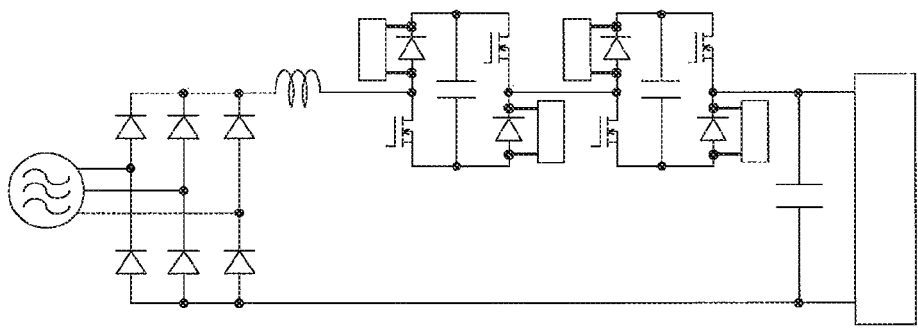
FIG. 40 illustrates another configuration example of the power converting device according to Embodiment 4.

FIG. 17 illustrates a configuration example of the short-circuiting means 4. For example, in FIG. 17(*a*), a short-circuiting rectifying circuit 41 having bridge-connected rectifying elements 41a to 41d and a short-circuiting switch 42 constitute the short-circuiting means 4. FIG. 17(*a*) shows a general configuration in which a single element that does not allow electric current to flow bidirectionally therethrough, such as an IGBT, is used as the short-circuiting switch 42. Alternatively, as shown in FIG. 17(*b*), the short-circuiting means 4 may be constituted of, for example, a bidirectional switch formed by using a plurality of IGBTs (insulated gate bipolar transistors), MOS-FETs (field-effect transistors), etc. In that case, a similar effect can be achieved.

Embodiment 4

FIGS. 31 to 40 illustrate configuration examples of a power converting device according to Embodiment 3 of the present invention. Means, elements, and the like that perform operations similar to those in the drawings described in, for example, Embodiment 1 are given the same reference numerals. The power converting device described in each of Embodiment 1 to Embodiment 3 described above corresponds to a single-phase alternating-current power supply. Alternatively, a power converting device of a similar type that corresponds to a three-phase alternating-current power supply, as shown in, for example, FIGS. 31 to 40, may be provided with the commutating means 7 and perform commutation control so that an effect similar to the above is achieved. Thus, even when a failure occurs in this commutating means 7, the device can be protected, whereby improved reliability can advantageously be achieved.

Embodiment 5

Figure 41:
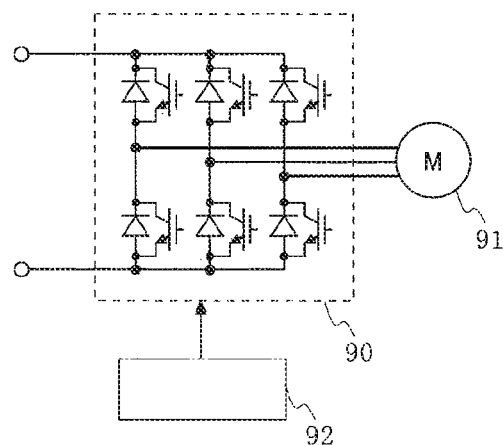
FIG. 41 illustrates a configuration example of a motor driving device according to Embodiment 5.

FIG. 41 illustrates a configuration example of a motor driving device according to Embodiment 5 of the present invention. In Embodiment 5, an inverter circuit 90 and a motor 91, as shown in FIG. 41, are connected so as to serve as a load that is supplied with electric power via the aforementioned power converting device. Furthermore, inverter control means 92 that controls the operation of the inverter circuit 90 is provided. By employing the power converting device according to the present invention, high efficiency and high reliability are achieved, and moreover, even when a failure occurs in the commutating means 7, the device can be protected, whereby improved reliability can advantageously be achieved. In the motor driving device according to Embodiment 5, if a malfunction of the commutating means 7 is detected in the power converting device at the front stage, the inverter control means 92 may control the operation of the inverter circuit 90 so as to reduce the load on the motor 91.

Embodiment 6

Figure 42:
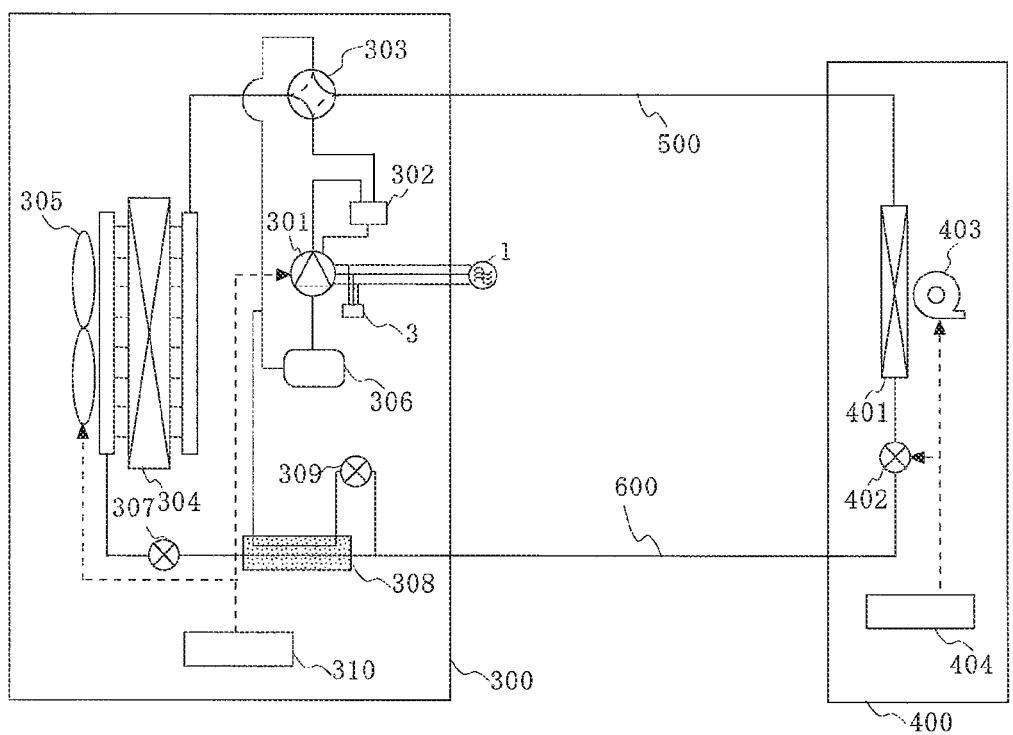
FIG. 42 illustrates a configuration example of a refrigerating and air-conditioning apparatus according to Embodiment 6.

FIG. 42 illustrates a configuration example of a refrigerating and air-conditioning apparatus according to Embodiment 6 of the present invention. Embodiment 6 corresponds to a case where the motor driving device according to Embodiment 5 described above is applied to one of or both of a compressor and an air-sending device in an air-conditioning apparatus.

The refrigerating and air-conditioning apparatus in FIG. 42 includes a heat-source-side unit (i.e., an outdoor unit) 300 and a load-side unit (i.e., an indoor unit) 400 that are connected by refrigerant pipes so that a main refrigerant circuit (referred to as "main refrigerant circuit" hereinafter) through which a refrigerant circulates is formed. The refrigerant pipes include a gas pipe 500 through which a refrigerant in a gas state (i.e., a gas refrigerant) flows and a liquid pipe 600 through which a refrigerant in a liquid state (i.e., a liquid refrigerant, or sometimes a two-phase gas-liquid refrigerant) flows.

In Embodiment 6, the heat-source-side unit 300 is constituted of devices (i.e., means) including a compressor 301, an oil separator 302, a four-way valve 303, a heat-source-side heat exchanger 304, a heat-source-side fan 305, an accumulator 306, a heat-source-side expansion device (i.e., an expansion valve) 307, a refrigerant-refrigerant heat exchanger 308, a bypass expansion device 309, and a heat-source-side control device 310.

The compressor 301 suctions a refrigerant, compresses the refrigerant, and discharges the refrigerant. The compressor 301 is of a type whose operating frequency is arbitrarily changeable such that the capacity (i.e., an amount of refrigerant fed per unit time) of the compressor 301 is finely adjustable. The power converting device according to any one of Embodiment 1 to Embodiment 4 described above is attached between, for example, the alternating-current power supply 1, which supplies electric power for driving the compressor 301 (i.e., a motor), and the compressor 301 serving as the load 9.

The oil separator 302 is configured to separate a lubricant, which is mixed in the refrigerant and discharged from the compressor 301, from the refrigerant. The separated lubricant is returned to the compressor 301. The four-way valve 303 changes the flow of the refrigerant between a cooling operation mode and a heating operation mode on the basis of a command from the heat-source-side control device 310. The heat-source-side heat exchanger 304 exchanges heat between the refrigerant and air (i.e., outdoor air). For example, during heating operation, the heat-source-side heat exchanger 304 functions as an evaporator and exchanges heat between the air and a low-pressure refrigerant flowing thereto via the heat-source-side expansion device 307 so as to evaporate and gasify the refrigerant. During cooling operation, the heat-source-side heat exchanger 304 functions as a condenser and exchanges heat between the air and a refrigerant flowing thereto from the four-way valve 303 side and compressed by the compressor 301 so as to condense and liquefy the refrigerant. In order to efficiently exchange heat between the refrigerant and the air, the heat-source-side heat exchanger 304 is provided with the heat-source-side fan 305. With regard to the heat-source-side fan 305, the rotation speed of the fan may be finely adjusted by supplying electric power thereto via the power converting device according to any one of Embodiment 1 to Embodiment 4 described above and, for example, arbitrarily changing the operating frequency of a fan motor in an inverter serving as the load 9.

The refrigerant-refrigerant heat exchanger 308 exchanges heat between a refrigerant flowing through a main flow path of the refrigerant circuit and a refrigerant that has diverged from the aforementioned flow path and whose flow rate has been adjusted by the bypass expansion device 309 (i.e., an expansion valve). In particular, when the refrigerant needs to be supercooled during cooling operation, the refrigerant-refrigerant heat exchanger 308 supercools the refrigerant and supplies the refrigerant to the load-side unit 400. The liquid flowing via the bypass expansion device 309 is returned to the accumulator 306 via a bypass pipe. The accumulator 306 is, for example, means for storing excess liquid refrigerant. The heat-source-side control device 310 is formed of, for example, a microcomputer. The heat-source-side control device 310 is capable of communicating with a load-side control device 404 in a wired or wireless manner. For example, based on data related to detection by various kinds of detecting means (i.e., sensors) within the refrigerating and air-conditioning apparatus, the heat-source-side control device 310 controls the overall operation of the refrigerating and air-conditioning apparatus by controlling each means related to the refrigerating and air-conditioning apparatus, such as by controlling the operating frequency of the compressor 301 by controlling an inverter circuit. Furthermore, the processing performed by, for example, the switching control means 103 described in each of above Embodiments may be performed by the heat-source-side control device 310.

The load-side unit 400 includes a load-side heat exchanger 401, a load-side expansion device (i.e., an expansion valve) 402, a load-side fan 403, and the load-side control device 404. The load-side heat exchanger 401 exchanges heat between a refrigerant and air. For example, during heating operation, the load-side heat exchanger 401 functions as a condenser and exchanges heat between the air and a refrigerant flowing thereto from the gas pipe 500 so as to condense and liquefy the refrigerant (or to change the refrigerant into a two-phase gas-liquid state), and discharges the refrigerant toward the liquid pipe 600. During cooling operation, the load-side heat exchanger 401 functions as an evaporator and exchanges heat between the air and a refrigerant changed into a low-pressure state by the load-side expansion device 402 so as to evaporate and gasify the refrigerant by making the refrigerant receive heat from the air, and discharges the refrigerant toward the gas pipe 500. Furthermore, the load-side unit 400 is provided with the load-side fan 403 for adjusting the flow of air that is to exchange heat with the refrigerant. The operating speed of the load-side fan 403 is set by, for example, a user. The load-side expansion device 402 is provided for adjusting the pressure of the refrigerant within the load-side heat exchanger 401 by changing the opening degree of the load-side expansion device 402.

The load-side control device 404 is also formed of, for example, a microcomputer and is capable of communicating with, for example, the heat-source-side control device 310 in a wired or wireless manner. Based on a command from the heat-source-side control device 310 or a command from, for example, a resident, each device (i.e., means) in the load-side unit 400 is controlled such that, for example, the indoor temperature is set to a predetermined temperature. Furthermore, a signal that contains data related to detection by detecting means provided in the load-side unit 400 is transmitted.

Accordingly, in the refrigerating and air-conditioning apparatus according to Embodiment 6, electric power is supplied to, for example, the compressor 301 and the heat-source-side fan 305 by using the power converting device according to any one of Embodiment 1 to Embodiment 4 described above, whereby a highly-efficient, highly-reliable refrigerating and air-conditioning system can be obtained. Furthermore, even when there is a problem due to, for example, a failure in the commutating means 7 of the power converting device, the device and the system can be protected, whereby improved reliability can advantageously be achieved.

INDUSTRIAL APPLICABILITY

Although Embodiment 6 described above is directed to a case where the power converting device according to the present invention is applied to the refrigerating and air-conditioning apparatus, the present invention is not limited to the above. The power converting device according to the present invention may also be applied to, for example, a heat pump apparatus, an apparatus that utilizes a refrigeration cycle (i.e., a heat pump cycle), such as a refrigerator, a transport apparatus, such as an elevator, or an illuminator (system). In that case, similar advantages can be achieved.

REFERENCE SIGNS LIST 1 alternating-current power supply 2 rectifier 2a to 2f rectifying element 3, 3a to 3c reactor 4, 4a, 4b short-circuiting means 5, 5a, 5b backflow preventing element 6 chopper circuit 7, 7a to 7d commutating means 8, 8a to 8d smoothing means 9 load 21 effective-bus-current-command-value computation unit 22 sine-wave generating unit 23 on-duty computation unit 24 malfunction processing unit 41 rectifier 41a to 41d rectifying element 42 short-circuiting switch 42a, 42b short-circuiting switch transformer 72, 72a, 72b rectifying element 73 transformer driving circuit 74, 74a, 74b commutation switch 75 commutation power supply 76, 76a, 76b capacitor 80, 80a, 80b protection means 90 inverter circuit motor 92 inverter control means 100 input-voltage zero-crossing detecting unit 101 bus-voltage detecting means 102 bus-current detecting means 103 switching control means 104 drive-signal generating unit 105 malfunction detecting means 106 interrupter switch 107 notification means 300 heat-source-side unit 301 compressor 302 oil separator 303 four-way valve 304 heat-source-side heat exchanger 305 heat-source-side fan 306 accumulator 307 heat-source-side expansion device 308 refrigerant-refrigerant heat exchanger 309 bypass expansion device 310 heat-source-side control device 400 load-side unit 401 load-side heat exchanger 402 load-side expansion device 403 load-side fan 404 load-side control device 500 gas pipe 600 liquid pipe

The invention claimed is:

1. A power converting device comprising:
   one or more backflow preventing elements that prevent electric current from flowing backward from a load side toward a power supply;
   a commutating unit for performing a commutation operation for causing electric current to flow toward a different path that is connected in parallel with the one or more backflow preventing elements;
   a malfunction detector for detecting a malfunction of the commutating unit; and a controller configured to control the commutating unit to perform commutation operation just before a recovery current flows through the backflow preventing element from the load side to the power supply and to perform operation control related to protection of the commutating unit on a basis of detection by the malfunction detector,
   wherein the commutating unit includes
   a commutation rectifying element that rectifies the electric current flowing through the different path,
   a transformer that performs the commutation operation by applying voltage based on voltage related to a primary winding to a secondary winding on the different path, and
   a transformer driving unit that controls excitation current caused by application of voltage to the primary winding of the transformer.

2. The power converting device of claim 1,
   wherein at least one rectifying element that constitutes the rectifying circuit that rectifies voltage related to the power supply serves as the one or more backflow preventing elements.

3. The power converting device of claim 2,
   wherein the commutating unit includes
   a commutation rectifying element that rectifies the electric current flowing through the different path,
   a transformer that performs the commutation operation by applying voltage based on voltage related to a primary winding to a secondary winding on the different path, and
   a transformer driving unit that controls excitation current caused by application of voltage to the primary winding of the transformer.

4. The power converting device of claim 2, further comprising
   a notification unit for performing notification,
   wherein the controller makes the notification unit perform notification of a malfunction in accordance with an output from the malfunction detector.

5. The power converting device of claim 1, wherein a plurality of the backflow preventing elements are each connected in parallel with the commutation rectifying element and the secondary winding of the transformer, and share the primary winding of the transformer.

6. The power converting device of claim 5,
   wherein the secondary windings are reversely wound so that the commutation operations corresponding to the backflow preventing elements are performed at different timings.

7. The power converting device of claim 1, wherein the transformer driving unit has a commutation power supply and a commutation switch and is connected to the primary winding of the transformer, and wherein the transformer driving unit controls the excitation current flowing from the commutation power supply toward the primary winding of the transformer by opening and closing the commutation switch.

8. The power converting device of claim 1, wherein the commutating unit includes a protection device for interrupting an electric-current path that includes at least one of the primary winding and the secondary winding of the transformer, wherein the controller makes the protection device interrupt the electric-current path in accordance with an output from the malfunction detector.

9. The power converting device of claim 1, wherein the controller adjusts a timing at which the commutating unit performs the commutation operation in accordance with an output from the malfunction detector.

10. The power converting device of claim 1, wherein the controller adjusts a time period for which the commutating unit performs the commutation operation in accordance with an output from the malfunction detector.

11. The power converting device of claim 1, further comprising a short-circuiting unit configured to short-circuit the power supply and control at least one of electric current and voltage,
    wherein the controller stops an operation of the short-circuiting unit in accordance with an output from the malfunction detector.

12. The power converting device of claim 1, further comprising:
    a notification unit for performing notification,
    wherein the controller makes the notification unit perform notification of a malfunction in accordance with an output from the malfunction detector.

13. The power converting device of claim 1, wherein the commutating unit includes an electric-current suppressing element or an electric-current interrupting element in an electric-current path that includes at least one of the primary winding and the secondary winding of the transformer.

14. The power converting device of claim 1, wherein a wide band-gap semiconductor is used as the commutation rectifying element.

15. The power converting device of claim 14,
    wherein the wide band-gap semiconductor is composed of silicon carbide, gallium nitride, or diamond.

16. A motor driving device comprising:
    an inverter unit that converts an output from the power converting device of claim 1 into alternating-current power;
    an inverter controller that controls the inverter unit; and
    a motor that is driven by the alternating-current power converted by the inverter unit.

17. The motor driving device of claim 16,
    wherein when the malfunction detector of the power converting device detects a malfunction, the inverter controller limits driving of the motor.

18. A refrigerating and air-conditioning apparatus comprising the motor driving device of claim 17 for driving at least one of a compressor and an air-sending device.

19. The power converting device of claim 1, further comprising:
    a rectifying circuit that rectifies voltage of the power supply;
    a smoothing unit that smoothes output voltage from the rectifying circuit;
    a short-circuiting unit that is disposed more closely to the power supply than the smoothing unit and that short-circuits the power supply and controls at least one of electric current and voltage; and
    a reactor that is disposed more closely to the power supply than the short-circuiting unit.

* * * * *